(12) United States Patent
MacDonald et al.

(10) Patent No.: US 9,697,644 B2
(45) Date of Patent: Jul. 4, 2017

(54) METHODS FOR SOLAR ACCESS MEASUREMENT

(71) Applicant: Solmetric Corporation, Sebastopol, CA (US)

(72) Inventors: Willard S. MacDonald, Sebastopol, CA (US); Robert MacDonald, Bolinas, CA (US)

(73) Assignee: Solmetric Corporation, Sebastopol, CA (US)

( * ) Notice: Subject to any disclaimer, the term of this patent is extended or adjusted under 35 U.S.C. 154(b) by 620 days.

(21) Appl. No.: 14/197,210

(22) Filed: Mar. 4, 2014

(65) Prior Publication Data

US 2014/0176543 A1    Jun. 26, 2014

Related U.S. Application Data

(63) Continuation-in-part of application No. 13/733,867, filed on Jan. 13, 2013, now abandoned, which is a continuation of application No. 12/952,101, filed on Nov. 22, 2010, now Pat. No. 8,386,179, which is a continuation of application No. 11/321,294, filed on Dec. 28, 2005, now Pat. No. 7,873,490.

(60) Provisional application No. 61/772,497, filed on Mar. 4, 2013.

(51) Int. Cl.
| G06T 17/00 | (2006.01) |
| G06T 17/05 | (2011.01) |
| G01S 3/786 | (2006.01) |
| G01W 1/12 | (2006.01) |
| G01J 1/42 | (2006.01) |
| G01J 1/02 | (2006.01) |

(52) U.S. Cl.
CPC ............ *G06T 17/05* (2013.01); *G01J 1/0266* (2013.01); *G01J 1/4228* (2013.01); *G01S 3/7868* (2013.01); *G01W 1/12* (2013.01)

(58) Field of Classification Search
CPC ........ G01S 3/7868; G06T 17/05; G01W 1/12; G01J 1/4228; G01J 1/0266
USPC .......................................................... 345/420
See application file for complete search history.

(56) References Cited

U.S. PATENT DOCUMENTS

| 3,305,686 A | 2/1967 | Carter et al. |
| 3,390,576 A | 7/1968 | Yellott |
| 4,177,566 A | 12/1979 | Haines |
| 4,288,922 A | 9/1981 | Lewis |
| 4,302,088 A | 11/1981 | Vezie |
| 4,430,000 A | 2/1984 | Eldering et al. |
| 4,445,030 A | 4/1984 | Carlton |

(Continued)

OTHER PUBLICATIONS

A. Konar et al., "Microprocessor based automatic sun tracker," IEEE Proceedings—A, Jul. 1991, vol. 138, No. 4, pp. 237-241.

(Continued)

*Primary Examiner* — Mark Hellner
(74) *Attorney, Agent, or Firm* — Maschoff Brennan

(57) ABSTRACT

A method for determining solar access at a position includes: obtaining an image of a horizon that includes a skyline; determining the azimuth orientation and the inclination of the obtained image; and determining solar access based on the skyline within the obtained image, the measured azimuth orientation and inclination of the obtained image, and a position associated with the image of the horizon. Other features and embodiments relating to solar access measurement are disclosed.

9 Claims, 13 Drawing Sheets

(56) References Cited

U.S. PATENT DOCUMENTS

| | | |
|---|---|---|
| 4,476,494 A | 10/1984 | Tugaye |
| 4,505,559 A | 3/1985 | Prinz |
| 4,588,295 A | 5/1986 | Eldering et al. |
| 4,635,371 A | 1/1987 | Dalrymple |
| 5,317,145 A | 5/1994 | Corio |
| 5,471,219 A | 11/1995 | Rodeffer et al. |
| 5,625,765 A | 4/1997 | Ellenby et al. |
| 5,682,332 A | 10/1997 | Ellenby et al. |
| 5,742,521 A | 4/1998 | Ellenby et al. |
| 5,808,583 A | 9/1998 | Roberts |
| 5,815,411 A | 9/1998 | Ellenby et al. |
| 5,838,330 A | 11/1998 | Ajima |
| 6,192,196 B1 | 2/2001 | Keller |
| 6,301,440 B1 | 10/2001 | Bolle et al. |
| 6,338,027 B1 | 1/2002 | Fulton |
| 6,680,693 B2 | 1/2004 | Urban et al. |
| 7,089,115 B2 | 8/2006 | Chapman et al. |
| 7,095,905 B1 | 8/2006 | Peterson |
| 7,305,983 B1 | 12/2007 | Meder et al. |
| 7,516,557 B2 * | 4/2009 | Courter ............ G01W 1/12 33/1 DD |
| 7,580,817 B2 | 8/2009 | Bing |
| 7,690,123 B2 | 4/2010 | MacDonald |
| 7,861,422 B2 | 1/2011 | MacDonald |
| 7,873,490 B2 * | 1/2011 | MacDonald ......... G01J 1/4228 250/200 |
| RE42,439 E | 6/2011 | Fulton |
| 8,249,302 B2 | 8/2012 | Ramalingam et al. |
| 8,471,906 B2 | 6/2013 | Belenkii et al. |
| 2003/0169200 A1 | 9/2003 | Urban et al. |
| 2004/0135989 A1 | 7/2004 | Klebe |
| 2004/0169770 A1 | 9/2004 | Widener et al. |
| 2006/0112575 A1 | 6/2006 | Moran |
| 2007/0150198 A1 | 6/2007 | MacDonald |
| 2007/0214665 A1 | 9/2007 | Courter |
| 2009/0049702 A1 | 2/2009 | MacDonald |
| 2009/0177458 A1 * | 7/2009 | Hochart ............ G06T 17/05 703/18 |
| 2010/0061593 A1 | 3/2010 | MacDonald et al. |
| 2010/0139105 A1 | 6/2010 | MacDonald |
| 2010/0302363 A1 | 12/2010 | Mackenzie |
| 2012/0121125 A1 | 5/2012 | Dimov |
| 2013/0314699 A1 * | 11/2013 | Jungerman ........ G01J 1/0266 356/139.01 |
| 2015/0002661 A1 * | 1/2015 | Dimov ............... G01W 1/12 348/135 |

OTHER PUBLICATIONS

Pacific Gas and Electric Company, "Using the Sun Path Software," 2003, 4 pages.
M. K. Dennis, "An Automated Solar Shading Calculator," Proceedings of Australian and New Zealand Solar Energy Society; 2002; 6 pages.
Panorama Master (in Swiss Language).
Horicatcher, Horizon analysis within seconds; Feb. 2006, 2 pages.
University of Oregon Solar Radiation Monitoring Laboratory; About sun Path Charts; Feb. 27, 2006; 3 pages.
Solar Pathfinder; Solar Pathfinder Fast Accurate Solar Site Analysis—Instruction Manual for the Solar Pathfinder; 2006; 27 pages.
Wiley Electronics LLC, Site Evaluation Tool; Oct. 2005 Press Release; 3 pages.

* cited by examiner

METHOD FOR DETERMINING SOLAR ACCESS within a computerized system comprising a 3D CAD model configured to obtain an image of a virtual horizon that includes a virtual skyline at a predetermined virtual position, wherein said virtual horizon corresponds to a real world horizon, said virtual skyline corresponds to a real world skyline, and said virtual position corresponds to a real world position:

obtaining an image of the virtual horizon determining the azimuth orientation and the inclination of the obtained image determining solar access based on the virtual skyline within the obtained image, the measured azimuth orientation and inclination of the obtained image, and the position associated with the image

*FIG.12*

METHOD FOR DETERMINING SOLAR RADIATION EXPOSURE at a predetermined position within a 3D CAD model utilizing a Solar Access Measurement Device ("SAMD") associated with the position:

tracing rays from the position of the SAMD to the sun determining whether the ray intersects an obstruction repeating for different locations of the sun and calculating the solar access

*FIG.13*

METHODS FOR SOLAR ACCESS MEASUREMENT

CROSS REFERENCE TO RELATED APPLICATIONS

This application is a continuation in part (CIP) of U.S. Ser. No. 13/733,867, filed Jan. 3, 2013; which is a continuation (CON) of U.S. Ser. No. 12/952,101, filed Nov. 22, 2010, issued as U.S. Pat. No. 8,386,179; which is a continuation (CON) of U.S. Ser. No. 11/321,294, filed Dec. 28, 2005, issued as U.S. Pat. No. 7,873,490; and further claims benefit of priority with commonly owned U.S. Provisional Ser. No. 61/772,497, filed Mar. 4, 2013;

the contents of each of which are hereby incorporated by reference.

BACKGROUND OF THE INVENTION

Field of the Invention

This invention relates to solar measurement equipment, and in particular to measurement equipment capable of measuring solar access.

Related Art

With the advent of the modern industrialized society, there is a constant need for energy to power the growing energy consumption needs of the society. At present, fossil fuels are the main source of this energy but factors such as fossil fuel deposit scarcity, resultant pollution from burning fossil fuels, and geopolitical factors that affect the price and availability of fossil fuels have resulted in a need for alternative sources of energy. An example of a popular form of alternative energy source is solar energy.

In order to utilize solar energy, solar energy systems have been created and designed to harness received solar radiation into thermal or electrical energy through various means. These solar energy systems typically include a solar energy collector to collect the solar radiation and other components that convert the collected solar radiation into either electrical or thermal energy.

These solar energy systems need to be designed and installed in locations and orientations with the highest solar radiation exposure in order to maximize the amount of solar radiation that may be collected by the solar energy systems. As a result, there is a need to measure the solar radiation access or solar access at a given location and orientation. Solar access is dependent on the amount of shade caused by obstructions surrounding the desired site of the solar energy system. These obstructions may be buildings, trees, vegetation, structures, or any other object that is in view from the desired site of the solar energy system. These obstructions may block the solar radiation from the sun and therefore are relevant to the measurement of shade and solar access.

Often a 3D CAD model (three dimensional computer aided design model) is used in the design process for a new solar energy system. This 3D CAD model may include a model of the desired installation site, such as a building or roof as well as models of the obstructions surrounding the site.

There exist a number of known systems for measuring solar access, including the commercial product known as the "SunEye" from Solmetric Corporation (www.solmetric.com). However, these systems are physical measurement devices meant to be placed in a real-world environment. Sometimes, it is desirable to sell and/or design a solar energy system without physically going to the desired installation site. In this case, it would be desirable to be able to measure the solar access without physically going to the site.

Therefore, there is a need for a new solar access measurement system that is capable of determining the shade and solar access at a given location without having the limitations associated with the existing known solar access measurement systems.

SUMMARY

In accordance with an embodiment, solar access at a given real-world position is determined using one or more images configured to represent a horizon and skyline at the real-world position. The one or more images may include images capturing a real-world horizon and a real-world skyline at the real-world position, or alternatively, the one or more images may include images representing the real-world horizon and the real-world skyline by way of a virtual horizon and a virtual skyline obtained from a 3D CAD model configured to represent features and obstructions associated with the real-world position.

In another embodiment, a method for determining solar access includes: obtaining an image of a horizon that includes a skyline; determining an azimuth orientation and an inclination of the obtained image; and determining solar access based on the skyline within the obtained image, the measured azimuth orientation and inclination of the obtained image, and a position associated with the image of the horizon.

In another embodiment, a method for determining solar access includes: obtaining an image of a horizon that includes a skyline; determining an azimuth orientation and an inclination of the obtained image; processing the captured image to locate the skyline in the captured image; determining paths of the sun throughout a range of times of day and days of year for a particular latitude of the predetermined location; and determining the amount of solar radiation that will impinge the predetermined location throughout the range In another embodiment, a method for determining solar access includes: within a computerized system comprising a 3D CAD model configured to obtain an image of a virtual horizon that includes a virtual skyline at a predetermined virtual position, wherein said virtual horizon corresponds to a real world horizon, said virtual skyline corresponds to a real world skyline, and said virtual position corresponds to a real world position: obtaining an image of the virtual horizon; determining the azimuth orientation and the inclination of the obtained image; and determining solar access based on the virtual skyline within the obtained image, the measured the azimuth orientation and inclination of the obtained image, and the position associated with the image.

In yet another embodiment, a method for determining solar radiation exposure at a predetermined position within a 3D CAD model includes: tracing rays from the position of the SAMD to the sun; determining whether the ray intersects an obstruction; and repeating for different locations of the sun and calculating the solar access.

Other systems, methods and features of the invention will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

FIG. 12 illustrates a method for determining solar access in accordance with an embodiment.

FIG. 13 illustrates a method for determining solar access in accordance with another embodiment.

DETAILED DESCRIPTION

In the following description of the preferred embodiment, reference is made to the accompanying drawings that form a part hereof, and which show, by way of illustration, a specific embodiment in which the invention may be practiced. Other embodiments may be utilized and structural changes may be made without departing from the scope of the present invention.

A Solar Access Measurement Device ("SAMD") is disclosed. The SAMD may be utilized as a "solar mapper" that is useful in the design and installation of solar energy systems, for example on a customer's roof or property, and a variety of other situations where solar radiation exposure needs to be measured, such as landscaping, architecture, ecological studies, fisheries, forestry, golf course management, realtors/appraisers, universities/technical schools, utility companies, etc. In general operation, the SAMD is positioned within a 3D CAD model and may capture a digital image with a virtual image sensor equipped with a wide angle lens of a skyline and measure the azimuth orientation and inclination of the image. The SAMD may then process the image to locate the skyline in the image and then predict the paths of the sun throughout the day and year for the particular latitude of the SAMD. The SAMD may then determine the amount of annual solar radiation that will impinge the position of the SAMD.

Figure 1:
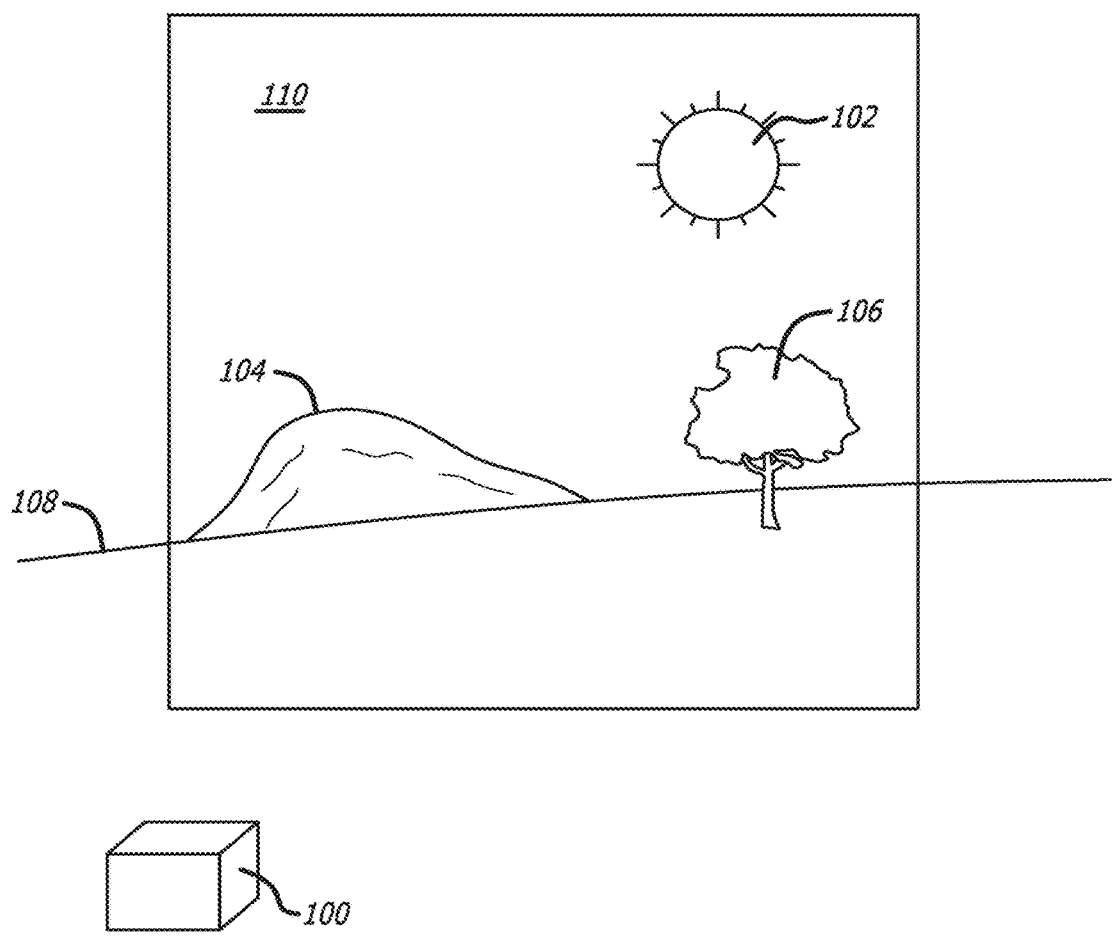
FIG. 1 is an example of an implementation of the Solar Access Measurement Device ("SAMD") in relation to open area and the sun.

In FIG. 1, an example of an implementation of the SAMD 100 is shown in relation to an open area and the sun 102. The open area may include solar obstacles such as, for example, a mountain 104, tree 106, hill, building, or other type of structure (not shown). The open area may also include the skyline 108 that is the line along which the surface of the earth, or solar obstacles, and the sky appear to meet in the horizon 110 relative to the SAMD 100. In general, the skyline 108 is the boundary between the open unobstructed sky and any earth-bound objects and includes all obstacles that will block the sun 102 at different times of the day and year, such as trees, buildings and mountains. In operation, the SAMD 100 captures an image of the horizon 110 and utilizes the captured image of the horizon 110 to determine the solar radiation exposure or solar access at the position or location of the SAMD 100.

The open area in FIG. 1 may be part of a 3D CAD model digitally representing a real-world open area. When it is a 3D CAD model, for example, the mountain 104 in FIG. 1 may be a representative digital model of a real mountain, the tree 106 may be a representative digital model of a real tree, and the sun 102 may be a representative digital model of a real sun. These models are part of the 3D CAD model within which the SAMD operates. Typically the 3D CAD model is geo-referenced, meaning that: a) every point in the 3D CAD model contains a latitude, longitude, and altitude that corresponds to the latitude, longitude, and altitude of that same point on earth in the real-world region that the model is representing, b) the 3D CAD model contains an azimuth orientation corresponding to the real-world. The azimuth orientation may be a magnetic orientation such that the magnetic orientation of the models of objects in the 3D CAD correspond to the magnetic orientation of the real-world objects relative to the magnetic field lines of the earth. Or alternatively the azimuth orientation may be an orientation relative to the true north and true south (directions of the poles) of the earth such that the orientation of the models of objects in the 3D CAD correspond to the orientation of the real-world objects relative to the poles of the earth, c) the 3D CAD model contains a gravitational orientation (e.g. pitch and roll) that corresponds to the orientation of the real-world objects being modeled relative to the earth's gravitational vector. Typically the 3D CAD model is also a scale model meaning that there is a single scaling factor that defines the length of distances within the model relative to the real-world that the model represents. There may also be different scaling factors for each of the three dimensions represented by the 3D CAD model. Typically the scaling factor, latitude, longitude, altitude, azimuth orientation, and gravitational orientation can be queried from the 3D CAD model, or from any position in the 3D CAD model, or are otherwise known by the user of the SAMD 100. In this way real-world physical phenomena such as the propagation of light rays or solar energy may be modeled in the 3D CAD model to accurately simulate the phenomena in the real-world.

In the 3D CAD model, the skyline 108 is the boundary between the open unobstructed model of the sky and the models of any earth-bound objects. In the 3D CAD model the SAMD, when in operation, captures an image of the horizon 110, for example with a virtual camera located at the position of the SAMD, and utilizes the captured image of the horizon 110 to determine the solar access at the location of the SAMD 100 within the 3D CAD model.

The 3D CAD model may be created by a person using 3D CAD modeling software such as "Sketchup" from Trimbal Navigation Systems or "AutoCAD" from Autodesk Inc. Alternatively the 3D CAD model may be created from LiDAR point cloud data. The LiDAR data may be collected from a manned or unmanned aircraft or from earthbound sensors. Alternatively the 3D CAD model may be created from aerial photography collected from a manned or unmanned aircraft or satellites, or from handheld, pole mounted, or otherwise earthbound cameras. A user may use the aerial photography along with 3D CAD modeling software to create the 3D CAD model using photogrammetric techniques in which three dimensional ("3D") information is extracted from multiple two dimensional ("2D") photographs taken of the same object from different perspectives. Alternatively the 3D CAD model may be automatically generated from a collection of aerial photographs. In this technique the 3D CAD model and surface textures may be automatically generated by software from the collection of photographs, resulting in "photo-realistic" 3D CAD models. Commercial examples of this technique can be seen from Apple Inc, for example, 3D satellite mode in Apple iOS 7.

In another example, a plurality of images may exist on a computerized database, each of the images being of a horizon having an associated skyline and position. The images can comprise one or more of virtual images, such as images obtained from a 3D CAD model configured to represent a real-world open space, real-world images, such as images captured from a camera lens, or any combination thereof. Each of the plurality of images can be catalogued by the position and an orientation of the image relative to a pole of the earth and a gravitational vector of the earth, or a virtual equivalent.

In one example of a sales process for a solar energy system, the sales person may fly a manned or unmanned aircraft over and around the vicinity of a house or building where the potential solar energy system may be installed taking photographs from different perspectives of the building and roof. Or the sales person may fly a manned or unmanned aircraft over and around the vicinity of a neighborhood, town, or city where a sales campaign is planned and take photographs of all or some of the houses or buildings in the area. The aerial photos may then be converted to a 3D CAD model manually by a human or automatically by software. The 3D CAD model may then be used to analyze the shadows and solar access of the roofs and sites of the potential customers using the SAMD.

Figure 2:
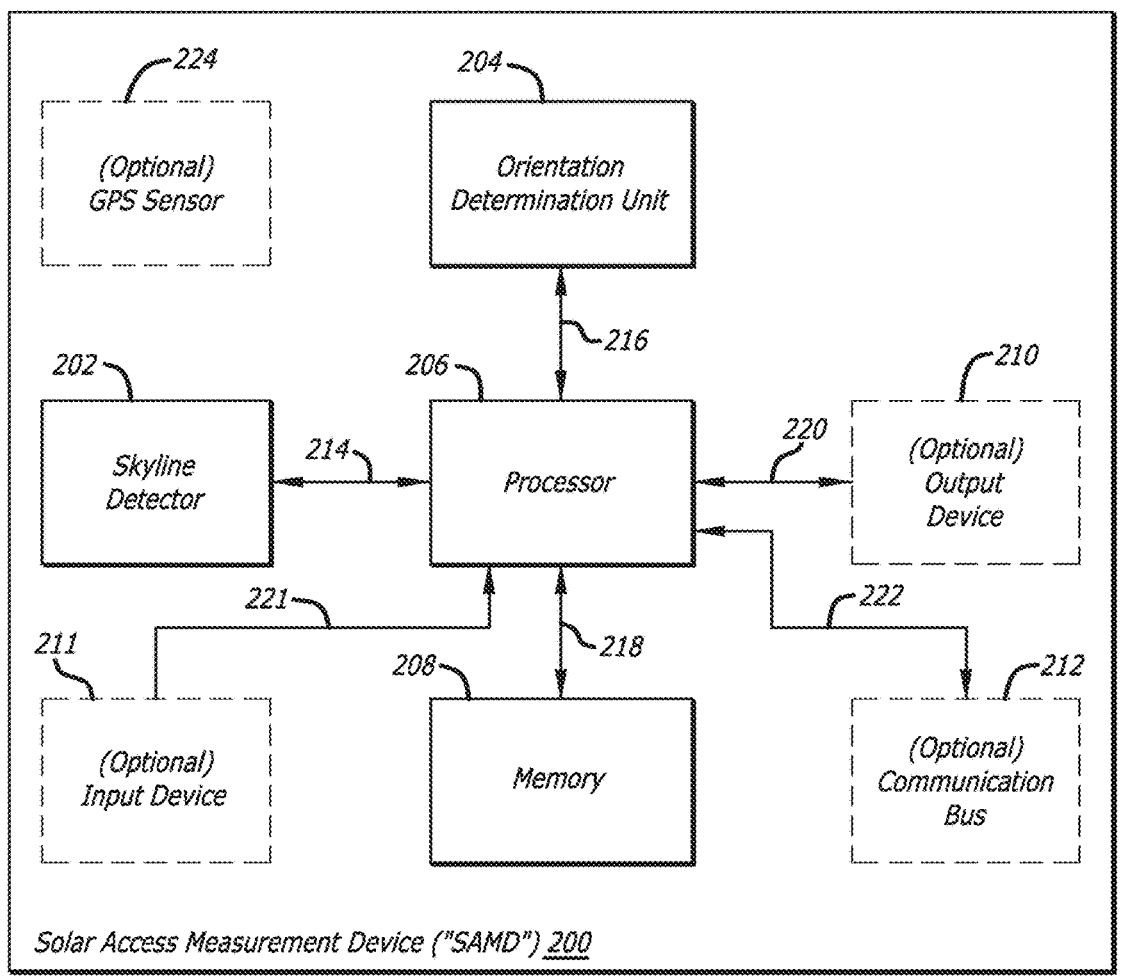
FIG. 2 is a block diagram of an example of an implementation of the SAMD.

In FIG. 2, a block diagram of an example of an implementation of the SAMD 200 is shown. The SAMD 200 may include a skyline detector 202, orientation determination unit 204, processor 206, memory 208, optional output device 210, optional input device 211, and optional communication bus 212. The processor 206 may be in signal communication with the skyline detector 202, orientation determination unit 204, memory 208, optional output device 210, optional input device 211 and optional communication bus 212 via signal paths 214, 216, 218, 220, 221 and 222, respectively.

The skyline detector 202 is generally a device capable of detecting the skyline of the horizon relative to the SAMD 200. In certain embodiments herein, the skyline detector 202 may be implemented in various configurations utilizing different components, algorithms, software, or methods.

As an example, the skyline detector 202 may include an image sensor that is a virtual image sensor. The virtual image sensor may capture an image of any surrounding structures, trees and other obstructions in the 3D CAD model. The virtual image sensor is located at a specific position or location in the 3D CAD model (generally specified by a precise latitude, longitude, and altitude). For example, the virtual image sensor may be located on the roof of a model of a house within the 3D CAD model. The virtual image sensor is oriented in a specific known orientation in tilt relative to the gravitational vector or horizontal plane and in azimuth relative to true south in the 3D CAD model. The orientation is known either by querying the 3D CAD model or it is entered by the user. This orientation is communicated to the orientation determination unit 204. In another example, the orientation determination unit 204 establishes the orientation by querying the 3D CAD model or it is entered by the user.

In one example, the virtual image sensor is equipped with a virtual lens with 180 degree FOV, and is pointing up and perpendicular to the horizontal plane (parallel to the gravitational vector) in the 3D CAD model. In this case, typically the virtual image sensor is oriented in azimuth (rotationally in the plane of the horizontal plane) so that the top of the resulting image is towards true south in the 3D CAD model. The resulting image will encompass 180 degrees in elevation and 360 degrees in azimuth in relation to the SAMD 200. The image may be circular or it may be a rectangular panorama. In another example, the virtual image sensor has a narrow FOV, for example 60 degree FOV, and is pointing toward the skyline along the true southern horizon in the 3D CAD model. The virtual image sensor may have any FOV. It is preferable for the FOV to be sufficient to capture an image that encompasses the entire extent of the sun paths superimposed on the image of the skyline in elevation and azimuth. If a more narrow FOV is used then some inaccuracy may result.

The image is extracted from the 3D CAD model by the virtual image sensor using known rendering techniques in 3D modeling and computer graphics software. One commercial example of this is the "camera" tool in the "Sketchup" 3D CAD software owned by Trimbal Navigation Limited (www.sketchup.com). The azimuth and elevation of every pixel in the image relative to the orientation of the SAMD are mathematically known inherently. This is a calibration of the virtual image sensor that is communicated to the processor 206. It is appreciated by those skilled in the art that the virtual image sensor is a metaphor used for the purposes of communicating a part of the embodiment and that any arbitrary image and perspective of the skyline or segment of the skyline within the 3D CAD model may be extracted from the 3D CAD model using programmatic means. The image captured by the virtual image sensor may have an arbitrary transformation determined mathematically and hence the captured image may include all or any amount of the skyline or horizon within the 3D CAD model. In all cases the pointing direction and rotational orientation of the virtual image sensor and image is communicated to the orientation determination unit 204 such that the pointing direction is represented as a two dimensional tilt relative to the horizontal plane and an azimuth angle relative to true south or some other means of fully communicating the orientation of the virtual image sensor and image within the 3D CAD model and the calibration of the virtual image sensor describing the elevation and azimuth relative to the SAMD of each pixel is communicated to the processor. It is appreciated by those skilled in the art that the calibration of the virtual image sensor is established through the inverse of the transformation that the virtual image sensor uses to capture the image. In the transformation from a view within the 3D CAD model to an image, the virtual image sensor may project the image in the view onto the image sensor. This may be understood as tracing a ray from each pixel in the image sensor through the lens to infinity or to the sky dome within the 3D CAD model. The lens may change the direction of the ray and establish a known elevation and azimuth of the ray coming out of the lens relative to the SAMD 200. The elevation and azimuth of the ray exiting the lens is based on the desired FOV of the lens and may be an arbitrary mapping. In one example the mapping is an ideal fisheye lens with 180 degree FOV. The first object that is intersected by the ray, which may be, for example, a point on a surface of an obstruction or a point on the sky dome, is sampled in color and luminosity and stored in the pixel of the virtual image sensor. The particular point in the 3D CAD model that is intersected by the ray depends on the 3D CAD mode, the scale of the model, the position of the SAMD 100 within the model, and the FOV of the lens. The elevation and azimuth of the ray exiting the lens is associated with the pixel at which the ray began. In this way a calibration of the virtual image sensor is established in which every pixel is associated with an elevation and azimuth angle relative to the SAMD 100.

The 3D CAD model is typically a digital representation of the real-world that may have obstructions and open sky that create a real-world skyline. Surfaces in the 3D CAD model are typically represented as solid colors or textures such that the resulting image captured by the virtual image sensor looks similar to what a real photo of the real-world skyline would look like. If the 3D CAD model is a wire-frame model or a mesh model solid colors or textures are applied to the surfaces. If the 3D CAD model is in the form of a digital elevation model (DEM) or a point cloud, it is first converted to a mesh and then solid colors or textures are applied to the surfaces. It is appreciated by those skilled in the art that the terms surface, color, texture, wire-frame, and mesh are used in describing and representing objects in a 3D CAD model and are, themselves, described by digital data or mathematical or geometrical equations. For example, a mesh is typically a group of small triangles that define a plane where each triangle is made up of three points or coordinates, each point having a location in space represented by three numbers such as (latitude, longitude, elevation) or (X,Y,Z). The virtual camera converts the digital data into an image that can be processed by the skyline processor. This image will typically have a continuous line representing the skyline. When the skyline in the 3D CAD model is a series of points rather than a line, the points along the skyline may be connected to create a continuous line representing the skyline in the 3D CAD model or captured image. This typically simplifies the subsequent processing by the skyline processor. In the 3D CAD model, the sky is typically represented as a sky dome or a large dome that encompasses the SAMD, all of the obstructions, and all the potential locations of the sun. A fixed texture or color and luminosity is used for the inside surface of the sky dome. A shade of blue and a bright luminosity is typically used. When the virtual image sensor captures an image of the skyline in the 3D CAD model, the color and luminosity of the inside surface of the sky dome will represent the open sky regions above the skyline 108. The exact color that is used for this sky dome can be excluded from the colors used on the surfaces of the obstructions, which simplifies the process of locating the skyline in the image in subsequent processing by the skyline processor.

The skyline detector 202 may further include a processor (not shown) and software (not shown) capable of analyzing the captured image captured by the virtual image sensor and locating the skyline in the captured image. It is appreciated by those skilled in the art that the processor (not shown) in the skyline detector 202 and the processor 206 may be the same processor or separate processors based on design preference for the SAMD 200.

It is appreciated by those skilled in the art that the SAMD 200 when located in a 3D CAD model may be implemented entirely as software running on a processor. It is also appreciated by those skilled in the art that this software may be the same software that is providing the 3D CAD model and the processor may be the same processor running both the SAMD 200 software and the 3D CAD model software.

Figure 4:
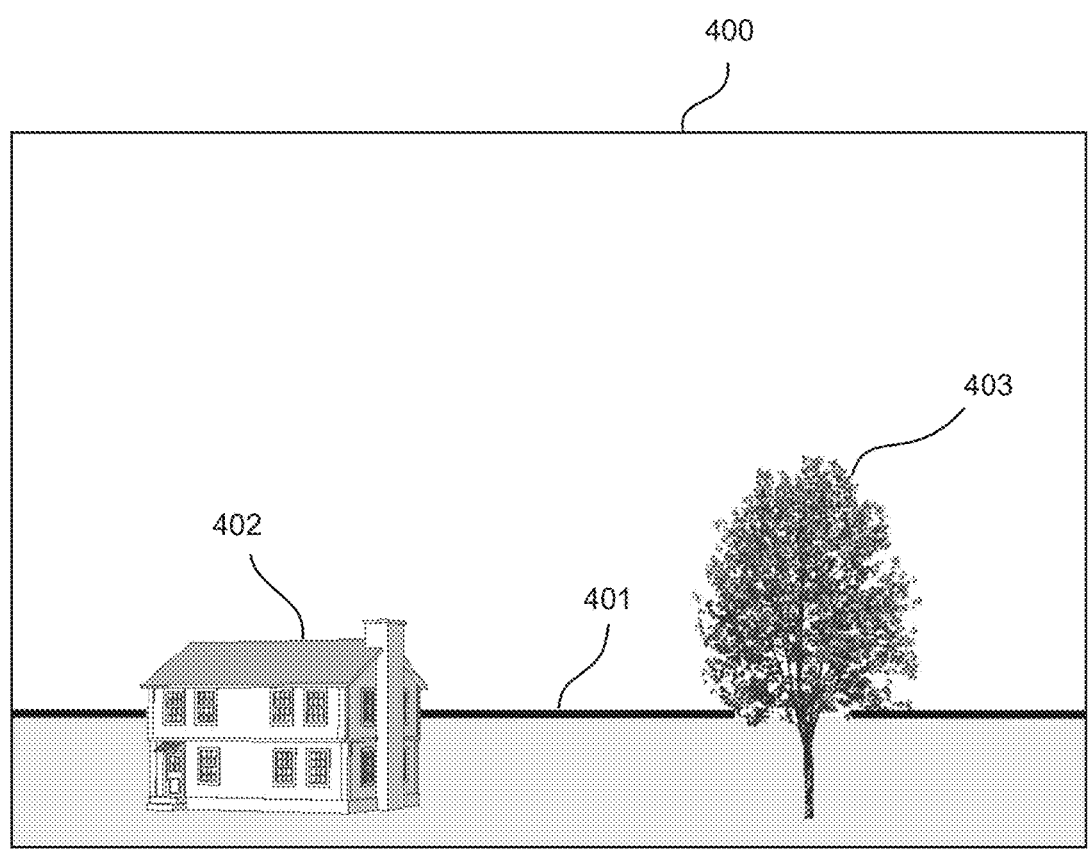
FIG. 4 is an image of a virtual horizon obtained from a 3D CAD model.

FIG. 4 is an example of an image 400 obtained from a 3D CAD model, the image comprising a virtual horizon 401. As described above, the 3D CAD model represents a real-world open area. In this example a tree 403 and a house 402 are illustrated as being present within the open area at a location associated with the image.

In yet another example, when the SAMD is in a 3D CAD model, the virtual image sensor may be considered to be two or more virtual image sensors with the resulting images stitched together. It is appreciated by those skilled in the art that the resulting stitched image is equivalent to the image that may be produced by a single virtual image sensor because a virtual image sensor may have an arbitrary transformation from the 3D CAD model to the captured image.

In yet another example, when the SAMD is in a 3D CAD model, the virtual image sensor may be a narrow FOV camera that is swept across the skyline in the 3D CAD model and multiple images are captured and stitched together. It is appreciated by those skilled in the art that the resulting stitched image is equivalent to the image that may be produced by a single stationary virtual image sensor because a virtual image sensor may have an arbitrary transformation from the 3D CAD model to the captured image.

In yet another example, when the SAMD is in a 3D CAD model, the virtual image sensor may have a narrow FOV and used in conjunction with a mirror that is a virtual mirror. The virtual mirror may be spherical, semi-spherical, flat, or may have any other arbitrary shape. The virtual mirror reflects an image of the skyline into the lens of the virtual image sensor. It is appreciated by those skilled in the art that the resulting image is equivalent to the image that may be produced by a virtual image sensor alone because a virtual image sensor may have an arbitrary transformation from the 3D CAD model to the captured image.

In yet another example, when the SAMD is in a 3D CAD model, the skyline detector 202 may include a laser rangefinder that is a virtual laser rangefinder instead of a virtual image sensor. The virtual laser rangefinder may be directed from the location of the SAMD to all the locations where the sun will appear throughout the day and year within the 3D CAD model. The virtual laser range finder may include a reflection detector. The reflection detector detects when the virtual laser is "reflected" by the surface of an object in the path of the laser in the 3D CAD model. It is appreciated by those skilled in the art that an the reflection is a virtual reflection that is generated by software that queries the 3D CAD model looking for an intersection between the virtual laser and a surface in the model that intersects the vector of the virtual laser line which has a specific elevation and azimuth at any given time. The SAMD 200 then keeps track of where objects were detected. A resulting open sky matrix, defined below, may be generated by recording all orientations of the laser with no laser reflections from obstructions such as models of trees or buildings.

It is appreciated by those skilled in the art that a virtual laser rangefinder is a metaphor that is used to aid in the description and understanding of the embodiment and in general the skyline detector may use ray tracing to map the skyline. In one example, the software models a geometric ray that originates at the SAMD and points sequentially in all possible directions, or in a subset of possible directions, in azimuth and elevation with respect to the SAMD. Known 3D modeling techniques are used to determine whether the ray intersects a plane anywhere in the 3D CAD model.

Generally the plane, planes, or mesh associated with the sky dome and sun are ignored and only the obstructions such as models of trees or buildings are analyzed. A resulting open sky matrix may be generated by recording all orientations of azimuth and elevation relative to the SAMD at which a vector originating at the SAMD and extending out at the orientation does not intersect an obstruction. The open sky matrix is communicated to the processor 206.

In another example, the software models a geometric ray that originates at the SAMD and ends at the location of the sun in the 3D CAD model. The ray is analyzed to determine if it intersects any of the obstructions. Then the sun is moved to another location in the 3D CAD model, the ray is analyzed for intersections, and the process is repeated until all possible locations of the sun through the day and year according to the latitude of the modeled location on earth have been analyzed. The locations of the sun may be modeled, for example, every 15 minutes of the year. The elevation and azimuth of the sun relative to the SAMD in the 3D CAD model is calculated as described below. For every location of the sun, a record of whether the ray intersected an obstruction or not is recorded in memory. An open sky matrix may be generated by recording all orientations of azimuth and elevation relative to the SAMD at which a vector originating at the SAMD and terminating at the sun does not intersect an obstruction. The open sky matrix is communicated to the processor 206. In yet another example, the software models a geometric ray that originates at the SAMD and ends at the location of the sun in the 3D CAD model. The ray is analyzed to determine if it intersects any of the obstructions. The amount of energy available from the sun when it is at that position in the sky relative to the orientation of the plane that the modules of the solar energy system will be oriented at is calculated as described below. If the ray intersects an object in the 3D CAD model, then the energy is zero. Then the sun is moved to another location in the 3D CAD model, the ray is analyzed for intersections, the energy impinging on the position of the SAMD 200 is calculated, and the process is repeated until all possible locations of the sun through the day and year according to the latitude of the modeled location on earth have been analyzed. The locations of the sun may be modeled, for example, every 15 minutes of the year. In this case the time period used to calculate the available energy (for example in kW-hr/m$^2$) is calculated by integrating the sun's power (for example in kW/m$^2$) over the 15 minute interval. For example, if the ray intersect an obstruction for more than half of the 15 minute interval, then the available energy is zero, otherwise it is the total available energy calculated for that time interval. In another example, the time interval may be a minute or any arbitrary time interval depending on the desired resolution of the calculation and the processing time. For every location of the sun, a record of the calculated energy impinging on the position of the SAMD 200 is recorded in a solar access matrix as defined below. The open sky matrix is communicated to the processor 206. The solar access matrix may then be integrated over different time periods to calculate the solar access over different desired time periods as described below. Alternatively, the intermediate step of storing a solar access matrix is eliminated. In this example, one or more running solar access calculation over one or more desired time periods is calculated at the time the ray tracing and interval energy calculations is performed. It is appreciated by those skilled in the art that the ray tracing and interval energy calculation may be performed by software within a loop (for example a "for" or "while" loop) in which the sun's position is adjusted each time the loop repeats. The running solar access calculation is updated each time the loop repeats. One of the running calculations may be the annual solar access, which is a number that would be complete once the entire year has been iterated through. In another example, one of the running solar access calculations may be the month of June, in which case the June solar access calculation will be complete once all iterations associated with June are complete.

In another example of the operation, the SAMD 200 may include a skyline detector 202 that includes an image sensor equipped with a lens that are a virtual fisheye camera that captures an image that is a calculated image extracted from 3D CAD model data of the obstacles that surround the measurement location. For a specified location (generally specified by a precise latitude, longitude, and altitude), the 3D CAD model is evaluated to determine the pixel value for each pixel in the calculated image. The pixel value is, for example, luminosity and color.

A known ideal calibration matrix giving the mapping of pixel row and column coordinates to elevation and azimuth angle in the calculated image is assumed. A linear fisheye image mapping is typical, although other image mapping such a panoramic can also be used. In a linear fisheye image mapping, the virtual camera is typically level (i.e. pointing up and perpendicular to the horizontal plane), and the pixel corresponding to the elevation angle that is straight overhead is typically mapped to the pixel at the center of the image. A fixed linear ratio is applied in determining the pixel distance from the center of the image for other given elevation angles down to the horizon. This gives a semispherical ultra-wide FOV. The calculated image pixel mapping is typically oriented to the true South, such that the direction of true South is at the top of the image and true North is at the bottom, although other orientations such as North at the top of the image can also be used.

The pixel value for each pixel in the circular image region corresponding to the FOV of the virtual fisheye camera is obtained by querying the 3D CAD model using known techniques. A commercial example of this is the "camera" tool in the popular "Sketchup" 3D CAD software owned by Trimbal Navigation Limited (www.sketchup.com). In one example, this is implemented as follows. For a specified latitude, longitude and altitude the 3D CAD model of the nearest obstruction in the direction given by the elevation and azimuth angles (as determined by the pixel row and column value in the calibration matrix) is evaluated. The pixel value including intensity and color is determined from the 3D CAD data for this nearest obstruction. In some cases regions of the obstruction may have photographic texture applied in the 3D CAD model. This texture can also be mapped onto the virtual fisheye camera image.

In the regions of the image that are open sky, which are above the skyline 108, the virtual fish eye image mapping is typically a fixed pixel value that represents the sky. A shade of blue is typically used. The exact pixel value that is used for this sky can be excluded from the mapped obstructions in the image. Having a unique pixel value for the sky in the virtual fisheye image simplifies the process of locating the open sky in subsequent processing of the image.

The processor ("the skyline processor") (not shown) in the skyline detector 202 may be any device capable of analyzing the images captured by the image sensor or reflections detected by the laser range finder and may be the same as the processor 206. In general, the skyline processor analyzes the captured images to locate the skyline where the novel techniques described below may be utilized for locating the skyline in the captured image. Generally, these techniques produce a set of pixels that describe where in the image the open sky is and where in the image the obstructions are. In one example, this data may be stored in an open sky matrix as described below. When the SAMD is located in a 3D CAD model the image sensor is a virtual image sensor, the image is the image captured by the virtual image sensor, and the skyline is the skyline in the 3D CAD model.

For example, the image pixels of the captured image may be scanned column by column. An intensity derivative function may be performed on the image pixels by starting at the top of a column and moving pixel by pixel down the column. Since the sky or inside of the sky dome is typically much brighter than the obstacles below the skyline, the intensity derivative will be largest between the pixel just above the skyline and the pixel just below. The coordinates between these pixels in the image plane may be stored as the location of the skyline in that column. More reliable performance may be achieved by averaging groups of pixels and using the groups to locate the skyline. The process may then be repeated for every column. When the camera is oriented such that the top of the image is above the skyline, such as when the camera is pointed at the horizon as opposed to vertically, then when starting from the top of each column, the process is more likely to succeed since open sky will generally fill the top of the image and the pixel position of the first high derivative will likely be the position of the skyline. In this case, also an estimate of the RGB (red, green, blue) color and/or luminosity of the sky may be established by scanning a predetermined area of the sky, for example the top 20% of the image, and averaging the pixels. This area is more likely to be open sky. This value may then be utilized to determine, for example, if the first pixel or group of pixels in a column is already below the skyline. Alternatively, a two dimensional derivative may also be utilized in which the intensity derivative is calculated along each row as well as down each column. The result is a two-dimensional derivative gradient from which the normal direction of the skyline may be calculated along the skyline. An edge detection scheme may then be utilized to locate the gradient peak. A reference intensity/color may be established, as described above, and used to select a threshold for doing the edge detection.

Alternatively, when the SAMD is located in a 3D CAD model and a known color and luminosity is used by the virtual image sensor to represent the inside of the sky dome in the captured image, this known color and luminosity may be used to identify the open sky directly. When a narrow FOV virtual image sensor is pointed approximately at the horizon or when a panoramic landscape image is captured such that the sky is along the top of the image, then the line in the image where the sky dome color and luminosity switch to another color and luminosity when searching from top to bottom is the skyline. When the image is oriented such that the center region of the image is pointing up at the sky and the horizon is along the perimeter of the image, such as when a 180 degree FOV lens is oriented vertically perpendicular to the horizontal plane in the 3D CAD model, then the skyline is found by searching radially outward from the center of the image until the pixel color and luminosity changes from the sky dome color to another color. In this case the skyline will surround a sky region roughly in the center of the image.

The orientation determination unit 204 is a device capable of determining the orientation of the SAMD 200 (or the skyline detector 202). The orientation determination unit 204 may include a compass (not shown) and an inclinometer (not shown) both of which may be either mechanical, electronic, or virtual. The orientation determination unit 204 may also include a GPS unit or may be in signal communication with optional GPS sensor 224. The orientation determination unit 204 may also receive the orientation through signal communication with the skyline detector 202. It is appreciated by those skilled in the art that orientation may include a three-dimensional pointing direction and/or attitude of a device, such as the device's azimuth pointing direction relative to the magnetic orientation or true orientation relative to the north pole within a plane that is perpendicular to the Earth's gravitation vector. Additionally, orientation may also include the pointing direction of the device in both elevation, azimuth, and two-dimension pitch relative to a level position where the level position may be defined as being within the plane that is perpendicular to the Earth's gravitational field.

When the SAMD 200 is located in a 3D CAD model, the compass is a virtual compass and the inclinometer is a virtual inclinometer. The objects in the 3D CAD model are typically oriented relative to one another in the same way as in the real-world. In the real world the objects have an azimuth orientation on the earth relative to true north. And in the real-world they have a tilt orientation relative to gravity or the ideal surface of the earth. These real-world orientations are preserved in the 3D CAD model such that azimuth and tilt orientations from one object to another and from the objects to the sun paths and from the objects to the SAMD 200 are all preserved. In the 3D CAD model True north and all other compass headings are known directions, and the gravitational vector perpendicular to the ideal earth's surface, also referred to as the horizontal plane, are known and consistent with the real-world. The virtual compass determines the azimuth of the SAMD 200 within the 3D CAD model by comparing its orientation relative to true north or true south in the 3D CAD model. The virtual inclinometer determines the tilt (eg roll and pitch) of the SAMD 200 by comparing its orientation relative to the horizontal plane in the 3D CAD model. Alternatively, the virtual image sensor in the skyline detector 202 directly communicates the orientation data to the orientation determination unit 204 based on its known orientation within the 3D CAD model. Its orientation is known by querying the 3D CAD model. Alternatively the orientation is known by the SAMD 200 and orientation determination unit 204 by the user entering the orientation based on how he places the SAMD in the 3D CAD model.

In another example of operation within a 3D CAD model, the SAMD 200 does not include an orientation determination unit 204. The orientation of the SAMD 200 within the 3D CAD model is known by the user when he places the SAMD inside the 3D CAD model or alternatively is known by the SAMD 200 by querying the 3D CAD model. The transformation of virtual image sensor is inherently known by the virtual image sensor. Therefore, the elevation and azimuth of every pixel in the image captured by the virtual image sensor is known relative to the 3D CAD model (as opposed to being relative to the orientation of the SAMD).

Generally, a latitude where the data is being collected by the SAMD 200 is needed. The latitude is preferably accurate to within, for example, +/−0.5 degrees, but may also be within a wider range, for example, +/−3 degrees. Small errors in latitude result in small errors in the estimated solar access. Alternatively, a user may enter the region of the world where the data is being collected, for example, northern California, and the SAMD 200 may determine the latitude from a table of regions in memory. This is done once when the SAMD 200 is first set up and does not need to be done again as long as the user remains in the same latitude band. Software in the processor 206 analyzes the detected skyline and based on the latitude, azimuth orientation (e.g. from compass), and inclination (from inclinometer), accurately predicts the sun's travel through the sky throughout the day and throughout the year. The captured skyline and open sky are then overlaid on top of the cumulative region of the sky through which the sun will pass (the "sun paths") and the software may accurately predict when in the day and year shadows will occur in the spot where the data was taken. When the SAMD is located in a 3D CAD model, the latitude is the latitude on earth that is being represented by the 3D CAD model. For example if the 3D CAD model is a model of the real-world objects in the vicinity of latitude 38.39 degrees and longitude −122.83 degrees, then the latitude used to calculate the sun paths is 38.39 degrees. The sun paths are matched up with the skyline image.

The optional output device 210 may be any device capable of displaying and/or outputting data related to the solar access of the SAMD 200. As an example, the optional output device 210 may be an image display device. The optional input device 211 may be any device capable of allowing a user or external device (not shown) to manually or mechanically input external information about the location, orientation, and/or position of the SAMD 200. As an example, the optional input device 211 may be a touchscreen or keypad. The memory 208 may be any type of storage device or memory that is capable or storing data or software for the processor 206 such as, for example, random access memory ("RAM"), read only memory ("ROM"), cache memory, or hard drive. The optional communication bus 212 is any device capable of allowing the SAMD 200 to electronically communicate information and/or data to a storage device (not shown) external to the SAMD 200. It is appreciated by those skilled in the art that when the SAMD 200 is located in a 3D CAD model, the input device 211 and output device 210 may be the same input and output devices used by the operator to interact with the 3D CAD model.

Figure 3:
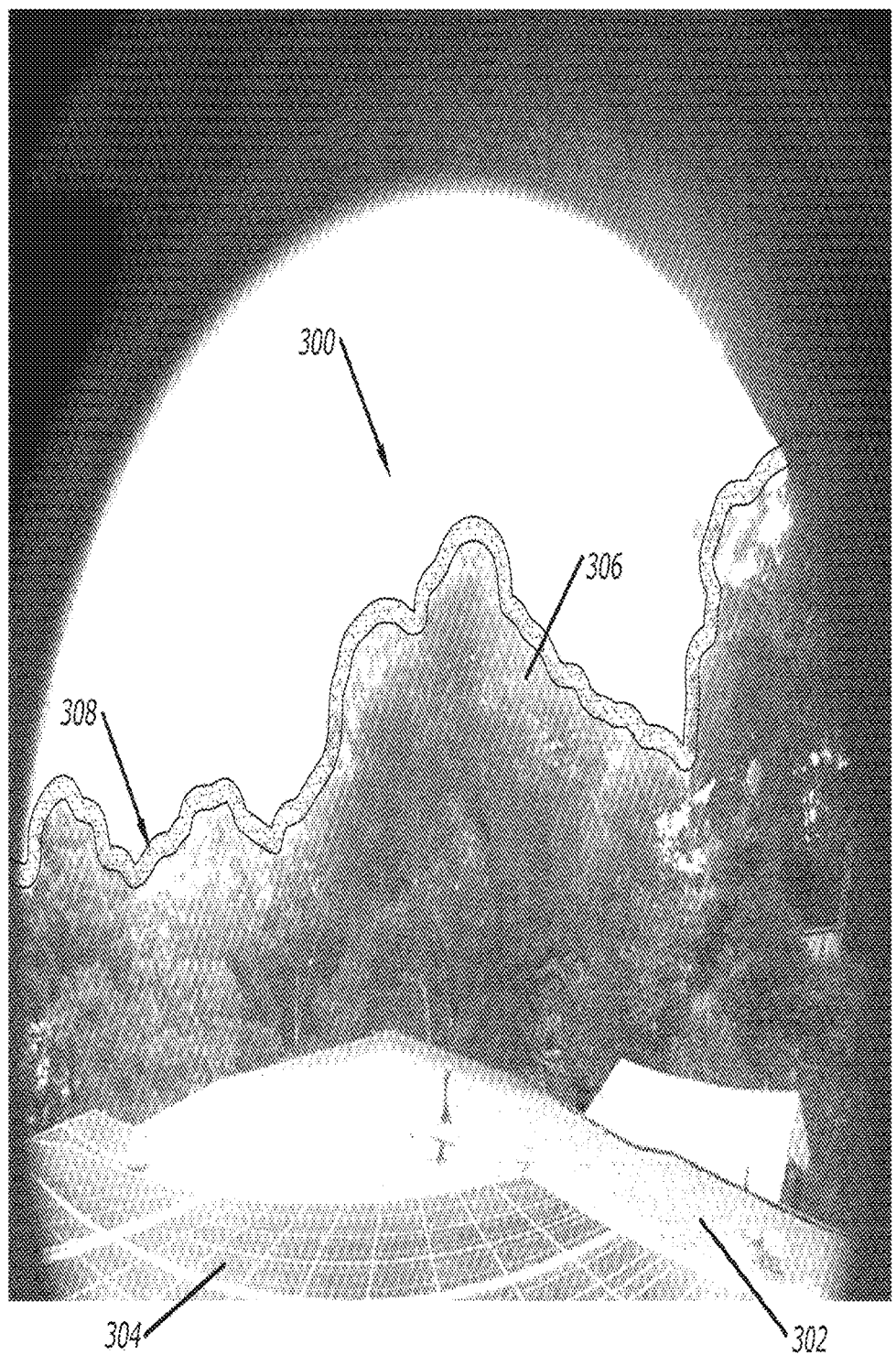
FIG. 3 is an example of a wide angle image captured with the skyline detector of the SAMD shown in FIG. 2.

FIG. 3 is an example of a wide angle image 300 captured with the skyline detector 202 of the SAMD 200. As an example, the wide angle image 300 may include a roof 302 of a structure (not shown), solar panels 304, trees 306, and skyline 308. In order for the processor 206 to calculate the sun paths and overlay them on the wide angle image 300, the skyline detector 202 is first calibrated.

The skyline detector 202 may be calibrated by mathematically modeling the optics of the lens and image plane such that the angular relationship between each pixel in the image plane is known and the angular relationship between each pixel and the enclosure of the SAMD 200 is known.

Figure 9:
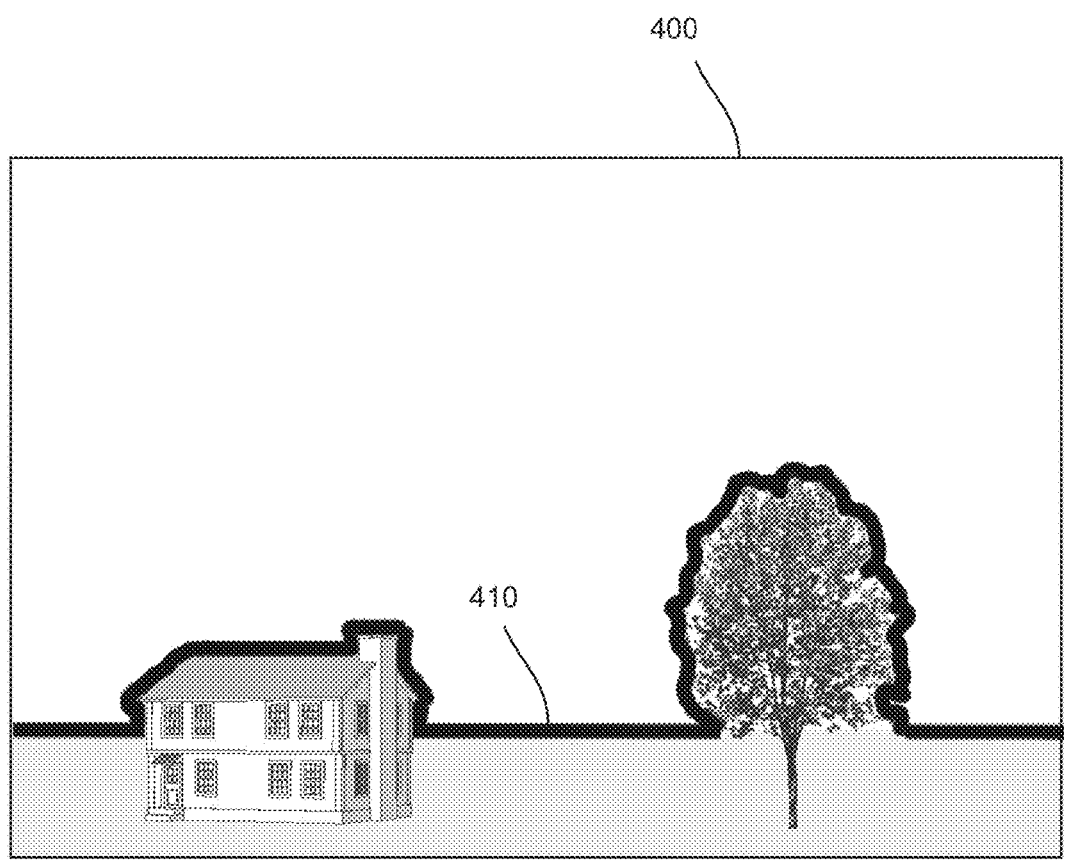
FIG. 9 shows an example of an image processed to locate a skyline.

FIG. 9 shows an image 400 obtained from a 3D CAD model with a virtual skyline 410 shown. The virtual skyline is detected by the skyline detector of the SAMD as described above.

Figure 5:
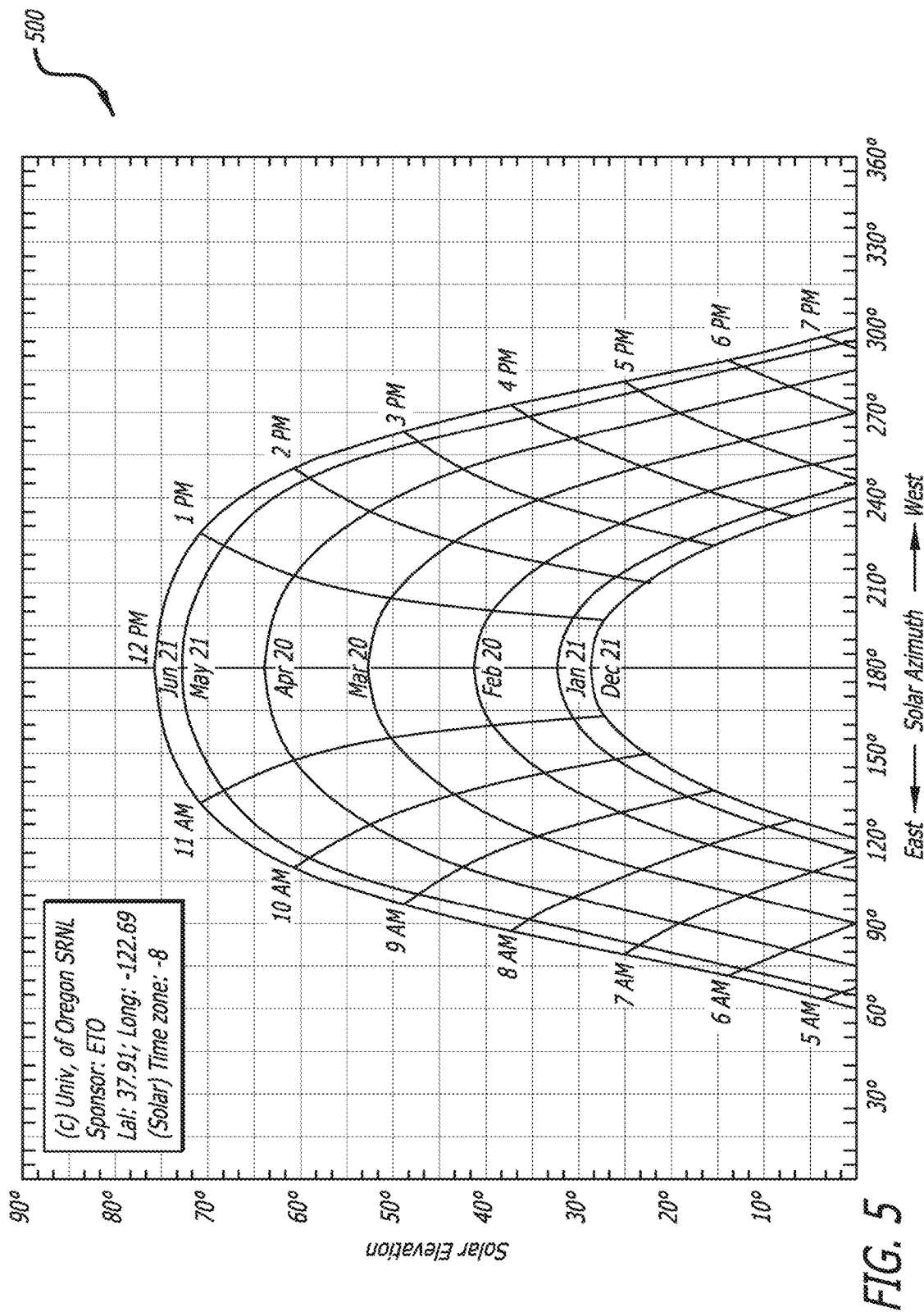
FIG. 5 shows an example of sun paths.
Figure 6:
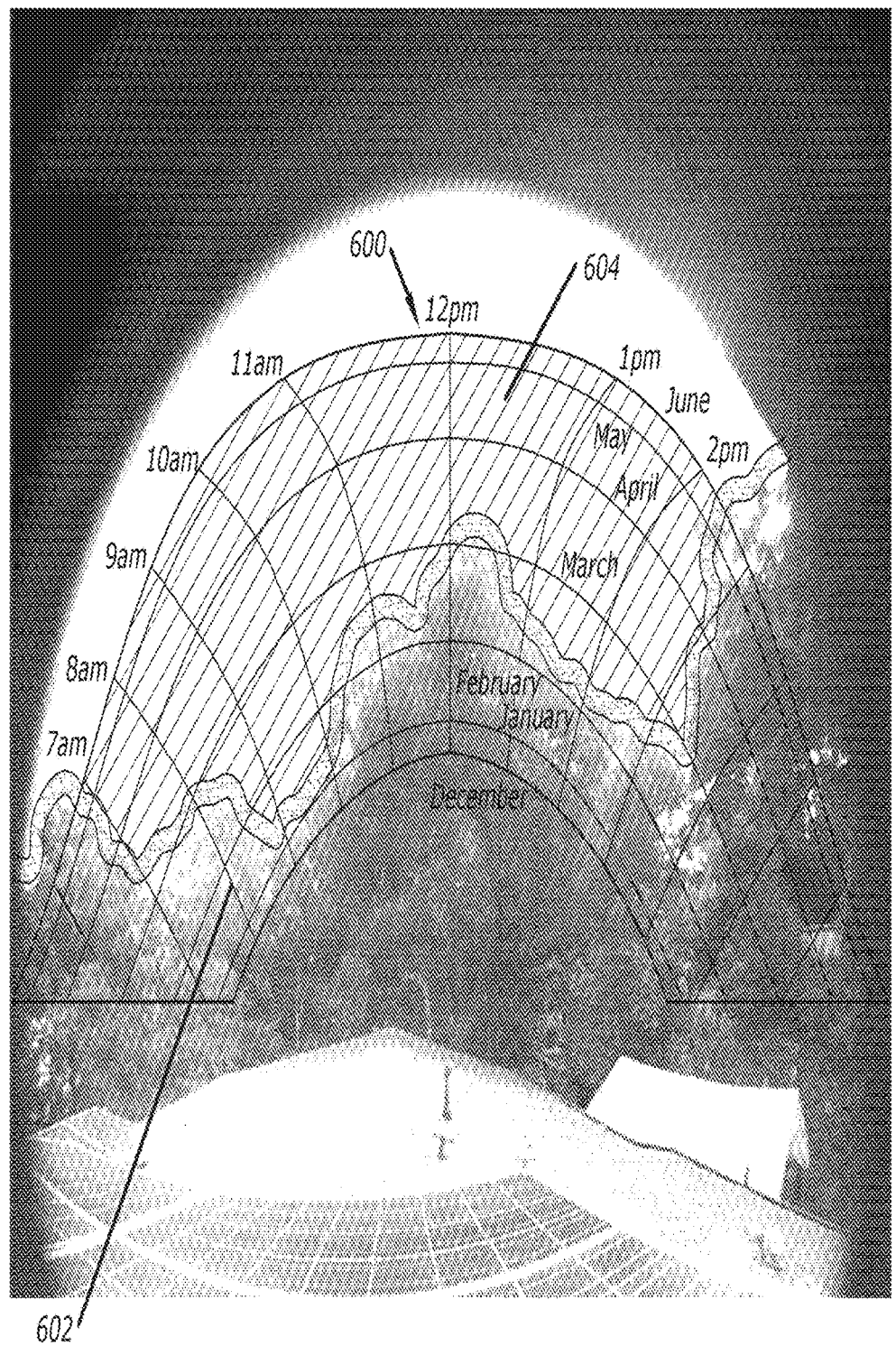
FIG. 6 shows an example of a superimposed sun path and skyline image generated by the SAMD of FIG. 2
Figure 7:
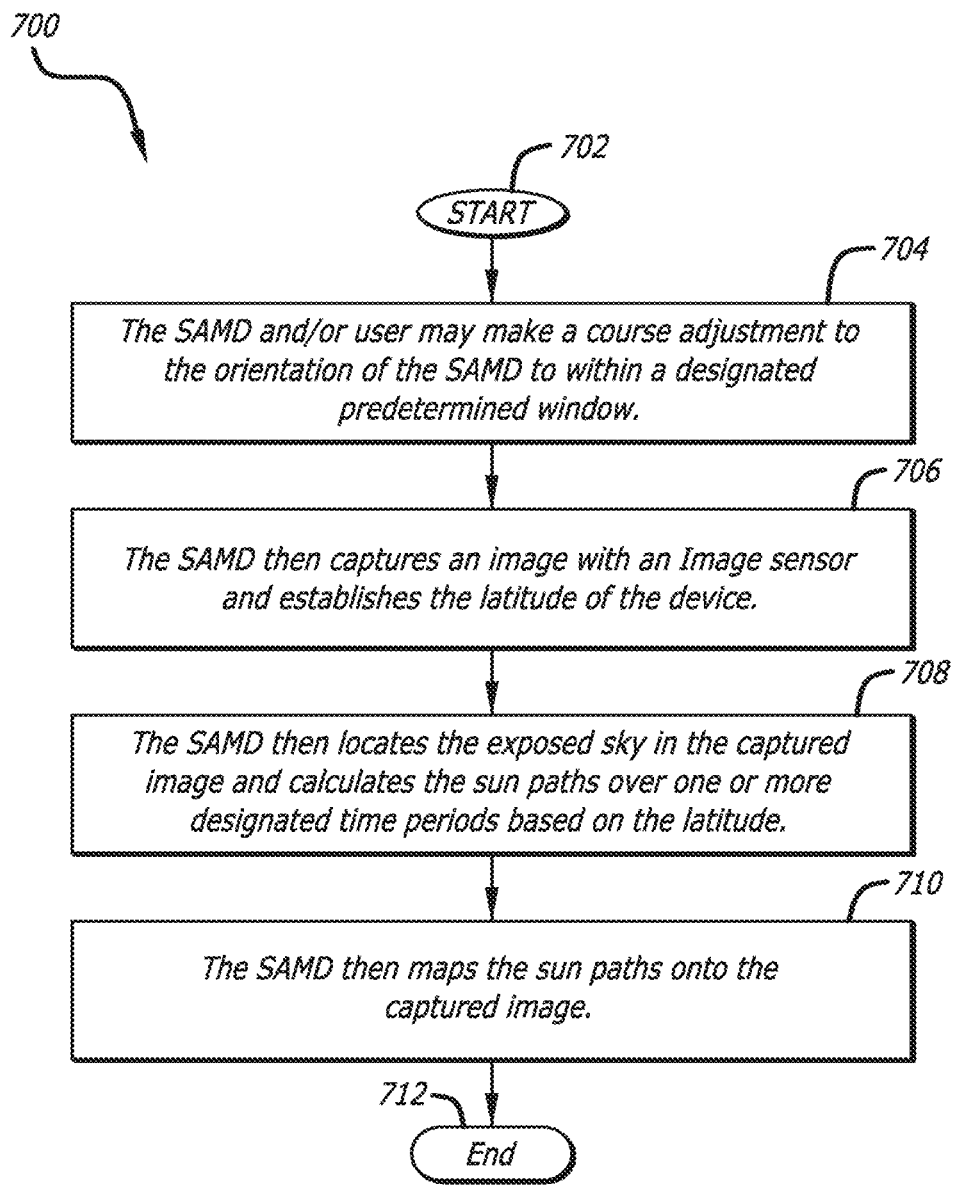
FIG. 7 shows a flowchart of an example of operation of the SAMD shown in FIG. 2.
Figure 8:
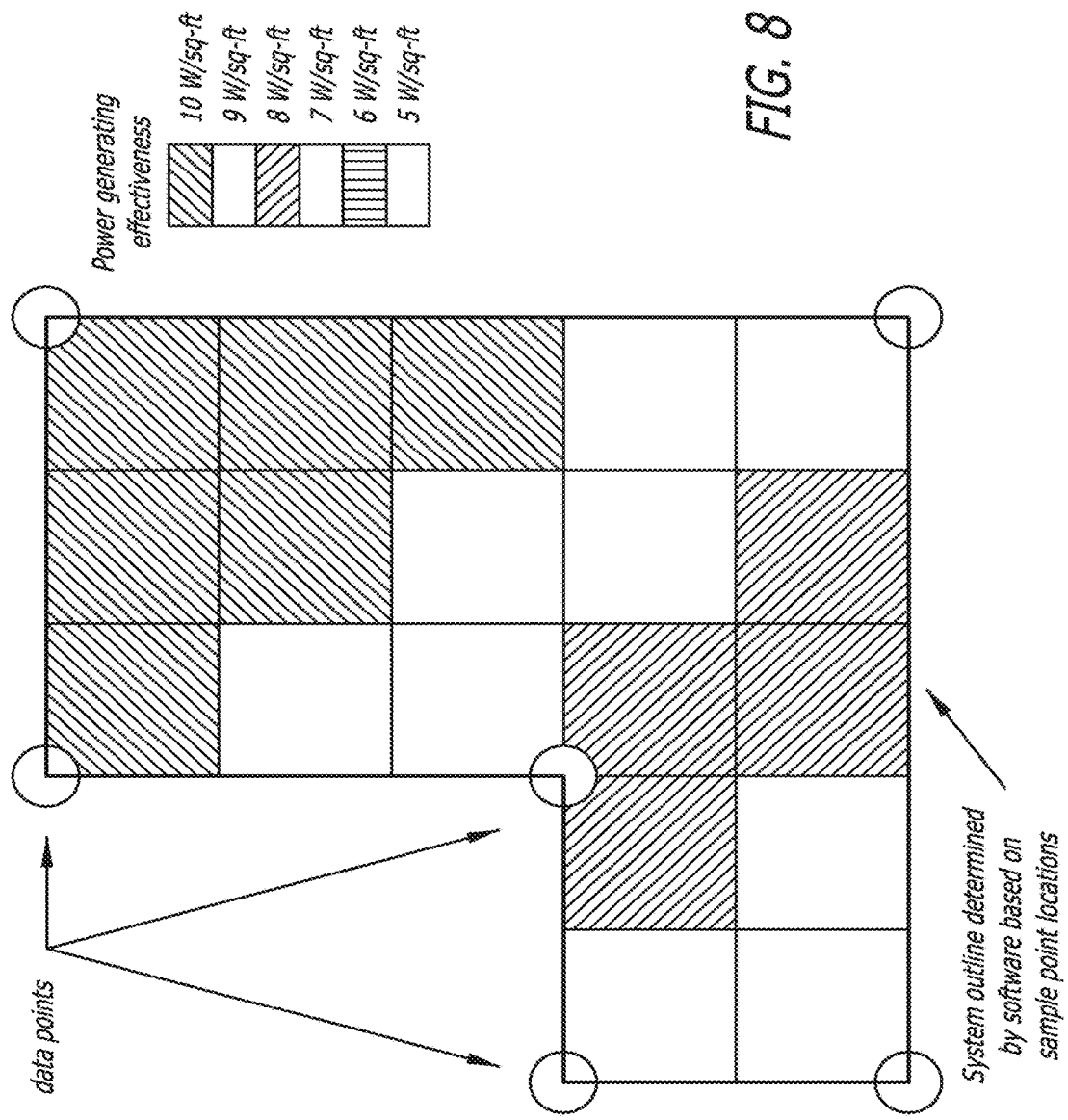
FIG. 8 shows an example of a "hot-spot" diagram generated by the SAMD of FIG. 2.

It is appreciated that the location of the sun in the sky may be calculated from latitude on earth, time of day and day of year from equations well known in the field of astronomy. As an example, by calculating the location of the sun every, for example, 30 minutes, through an entire day, a sun path may be determined for that day. By calculating the sun paths for every day of the year, a sun band can be determined. This band includes all locations of the sun throughout the day and throughout the year. The band may then be mapped into a matrix that represents where in the image the sun paths would appear. The matrix may be specific to the elevation and azimuth angles of the sun relative to the SAMD. An example of a plot 500 showing all sun paths is shown in FIG. 5. In FIG. 6 for a SAMD positioned in the real-world, and in FIG. 9 for a SAMD positioned in a 3D CAD model, an example of a skyline image 600 with sun path grid lines 602 superimposed on the captured image 300 of FIG. 3 is shown. The area 604 of the sun paths that is in open sky is shaded (as denoted by crosshatching). From this shaded region 604 the total solar energy that will impinge the location of the SAMD 200 may be calculated.

In another example of when the SAMD is positioned in a 3D CAD model, the sun may be modeled as a circle or sphere within the 3D CAD model. Its position at every time throughout the year may be modeled and the resulting band representing all location of the sun may also be modeled. An image captured by the virtual image sensor may look, similar to the image in FIG. 9. The same combined sun path and obstruction image may be generated either by modeling the sun path as an object in the 3D CAD model before the image is captured by the virtual image sensor and when the sun path image is superimposed on top of the an image captured by the virtual image sensor without the sun paths modeled as an object in the 3D CAD model before the virtual image sensor captures the image.

In an example of operation, once the open sky matrix has been identified and the sun paths matrix has been calculated, the two matrices may be analyzed by the processor 206 to generate a third matrix representing the intersection of the open sky and the sun band. The intersection matrix corresponds with the shaded area 604 in FIG. 6 and FIG. 11. In general, the "open sky matrix," "sun paths matrix," and "intersection matrix" are each two-dimensional binary arrays indexed by elevation and azimuth. The elevation and azimuth indexes are typically relative to the SAMD 100. A '0' in a cell of the open sky matrix indicates that the sun is blocked (i.e., below the skyline) at that elevation and azimuth. A '1' indicates that the sun is not blocked and is therefore part of the open sky. A '0' in a cell of the sun paths matrix indicates that the sun is never at that elevation and azimuth at any time during the year. A '1' indicates that at some time and day the sun is at that elevation and azimuth and is therefore part of the sun paths. The intersection matrix is the logical AND of the open sky and sun paths matrices. This intersection matrix is further analyzed to determine all elevations and azimuths or times of day and days of year when the sun would be in open sky that is not obstructed from view at the location of the SAMD by some obstacle. A fourth two-dimensional matrix called the "solar access matrix" can be generated by calculating the solar radiation of the sun for every elevation and azimuth corresponding to a '1' in the intersection matrix. The elevation and azimuth are typically relative to the SAMD 100. The solar radiation is based on the sun's power (approximately 1367 $W/m^2$) and the angle of the sun's ray relative to the angle of the collector panel. The above steps of detecting the skyline, mapping the sun paths, and calculating the solar access for any given time period may be performed quickly or even "instantaneously", that is, the steps all occur in simply the amount of time required for the electronics and processors to operate. Modifications may be made to the data to account for tree leaf loss. For example, evergreen trees do not lose their leaves and so will cast the same shadows year round. Deciduous trees may be identified by the user and can be treated differently by the processor 206. For example, if the data was collected during a season when the tree has little or no leaves, the processor 206 can assume shading during the leaf bearing months of the year. If the data was collected during a season when the tree has most or all of its leaves the processor 206 can assume less shading during the months when the tree will lose its leaves. When the SAMD is positioned in a 3D CAD model, the model may be analyzed separately with and without leaves on the deciduous trees. Or alternatively, the model of the trees may change dynamically depending on the day of year being simulated. In this way the progressive loss of leaves in the fall and winter months of the year and the subsequent growth of leaves in the spring and summer months may be modeled in the 3D CAD model.

The solar access matrix is a set of data that may be formatted in many different ways. For example, it may be integrated across time of day and day of year to get a single number that is the cumulative annual sun exposure in W*h/m² for the particular location. This could then be converted to a Kilowatt-hour (KWhr) number representing the predicted electrical energy generation of a particular solar panel configuration, size, and technology (e.g., Crystalline Silicon, Amorphous Silicon "Thin film", etc). Or it may be converted to a dollar amount if Net Metering and/or Time-of-Use metering is used to interconnect with the utility. Further, more detailed, representations of the data may be made. For example: a bar chart of solar radiation in each month of the year, a recommended direction in which to move the panels to improve production, a recommended tilt angle for the panels, or a suggestion of obstacles to remove to improve solar exposure (the obstacle may be identified in the skyline image and if it's a tree, it could be trimmed). A database of average temperatures for the region may be used in the calculation of the power generated by the panels because panels produce different amounts depending on their temperature.

It is appreciated by those skilled in the art that some of the energy coming from the sun is lost due to passing through the atmosphere and clouds. The software in the processor 206 may correct for these effects with the clearness index ("KT") for the given location. A database of KT values for different locations is obtained by measuring solar radiation continuously over time and recording the average solar energy year for year. This annual solar radiation data is available from groups such as NREL (National Renewable Energy Laboratory) and may be incorporated in the memory (not shown) of the processor 206 and used to calculate the solar access.

In operation, the SAMD 200 determines the solar access of a specific location based on an image captured by the SAMD 200 from within a 3D CAD model. The process begins in step 1, and in step 2, the user may utilize, create, or acquire a geo-referenced 3D CAD model of the objects in the vicinity of the specific location including any obstructions that may interfere with the sun casting light on the location. In step 3 the user then designates the specific location in the 3D CAD model and the SAMD 200 is positioned at that location within the model. In step 4, the SAMD 200 then queries the 3D CAD model for the latitude, longitude, scaling factor, azimuth orientation, and gravitational orientation of the 3D CAD model. Alternatively the user enters the latitude, longitude, scaling factor, azimuth orientation, and gravitational orientation of the 3D CAD model. In step 5, the SAMD 200 captures an image of the skyline with an image sensor that is a virtual image sensor. In step 6, the SAMD 200 then locates the exposed sky in the captured image and calculates the sun paths over one or more designated time periods based on the latitude in step 4. Next, in step 7, the SAMD 200 maps the sun paths onto the captured image. The process then ends in step 8.

The process may also further include the steps of identifying where the exposed sky and the sun paths overlap; and calculating the amount of solar energy that reaches the location of the SAMD 200. The azimuth and elevation relative to the SAMD 100 of every pixel in the captured image is known by the virtual image sensor.

Location of the skyline in the captured image may be done by image processing in the processor 206 or an external processor (not shown) in signal communication via the optional communication bus 212. Generally, light areas in the top of the image are assumed to be open sky and the boundary between the light sky and the dark earth-bound objects is the skyline. In another example, the color and luminosity of the sky dome in the 3D CAD model is assumed to be the sky color and all other pixel values are assumed to be obstructions. The intersection may be found using an intensity derivative along columns of pixels.

As an example, the orientation of the SAMD 200 may be established simultaneously with capturing the image. The orientation of the SAMD 200 is the azimuth orientation of the SAMD 200 within the horizontal plane and the dual axis inclination of the SAMD 200.

The SAMD 200 may implement a method in which matrices are used to manipulate the data. The image captured by the virtual image sensor can be thought of as a matrix of pixels. The pixel (i, j) is the pixel in the $i^{th}$ row and $j^{th}$ column of the image plane. A calibration step or mathematical transformation based on the scale of the 3D CAD model and the operation of the virtual image sensor associates each pixel or groups of pixels with the elevation and azimuth angles of the ray passing from a pixel in the virtual image sensor through the lens and hitting a point within the 3D CAD model. The result is the image plane calibration matrix, $IMAGE_{cal} = (\theta_c, \phi_c)_{i=1 \ldots C, j=1 \ldots R}$. $(\theta_c, \phi_c)_{ij}$ is an elevation and azimuth angle pair defining a vector relative to the three degree orientation of the SAMD 200 $O=(\Theta, \Phi, \Gamma)_{device}$, where $\Theta$ is the elevation offset angle defined as the angle of deviation of the pointing direction of the SAMD 200 from the plane that is normal to the direction of the earth's gravitational field vector (i.e., deviation from level front to back). $\Phi$ is the azimuth offset angle defined as the angle of deviation of the pointing direction of the SAMD 200 from true south (in the northern hemisphere) or true north (in the southern hemisphere) where rotation is about the axis that is equivalent to the earth's gravitational field vector. $\Gamma$ is the horizon offset angle defined as the deviation about the axis of the pointing direction of the SAMD 200 of the plane of the SAMD 200 from the plane that is normal to the direction of the earth's gravitational field vector (i.e., deviation from level side to side). The calibration is made for each pixel by iterating for i=1 to R and j=1 to C, where R is the total number of rows, and C the total number of columns, in the image plane. The elevation and azimuth of pixel (i,j) is known by the virtual image sensor because in operation the virtual image sensor may trace a ray from each pixel in the image sensor through the lens to infinity or to the sky dome within the 3D CAD model. The lens may chang the direction of the ray and establish a known elevation and azimuth of the ray coming out of the lens relative to the SAMD 200. The elevation and azimuth of the ray exiting the lens is based on the desired FOV of the lens and may be an arbitrary mapping. In one example the mapping is an ideal fisheye lens with 180 degree FOV. The elevation and azimuth of the ray exiting the lens is associated with the pixel (i,j) at which the ray began. In this way a calibration of the virtual image sensor is established in which every pixel is associated with an elevation and azimuth angle relative to the SAMD 100.

Next the orientation of the SAMD 200 within the 3D CAD model is established. For example, the orientation may be established either by querying the 3D CAD model, or it is entered by the user. It may be a predetermined orientation such as due south, and level relative to the earth's gravitational field along two axes. Next an image is captured.

In this example, simultaneously with capturing the image, the orientation may be measured, for example, with a virtual electronic compass and virtual electronic inclinometer. The virtual electronic compass and virtual electronic inclinometer may query the 3D CAD model to establish the orientation.

Next, the current image plane azimuth/elevation matrix, IMAGE=$(\theta, \phi)_{i=1 \ldots C, j=1 \ldots R}$, is calculated from the calibration matrix, $IMAGE_{cal}$, and the orientation vector of the SAMD 200, O. $(\theta, \phi)_{ij}$ is the elevation and azimuth angles relative to the vector that is pointing south (in the northern hemisphere) or north (in the southern hemisphere) and normal to the gravitational field vector (i.e., level). IMAGE is calculated by transforming the $IMAGE_{cal}$ matrix by the orientation O. For example, if the O=(1, −2, 0), then IMAGE=$(\theta, \phi)_{ij}=(\theta_c, \phi_c)_{ij}-(1, -2)$.

Next the captured image is mapped to the image plane azimuth/elevation matrix IMAGE by associating $pixel_{i,j}$ in the image with $(\theta, \phi)_{ij}$. Then the exposed sky is located within the captured image as described earlier. Then the located skyline is used to define a subset SKY of matrix IMAGE consisting of all pixels representing exposed sky.

Next the latitude of the SAMD 200 is queried from the 3D CAD model or alternatively it is entered by the user. The sun paths are calculated throughout the day and year. The sun paths are then mapped onto the matrix IMAGE, defining a subset SUN of the matrix IMAGE that represents locations of the sun within the image plane throughout the day and year.

Next a matrix EXPOSURE is defined and calculated as the intersection of the matrices SUN and SKY. A weighed integration of the matrix EXPOSURE across rows and columns is performed to obtain the total solar energy that hits the location. Weighting may be, for example, based on solar intensity for elevation and azimuth, average weather patterns, clearness index (KT), orientation of exposed surface, etc.

In yet another example of operation, the SAMD 200 determines the solar access of a specific location based on ray tracing within the 3D CAD model. The process begins in step 1, and in step 2 the user may enter or create a geo-referenced 3D CAD model of the objects in the vicinity of the specific location including any obstructions that may interfere with the sun casting light on the location. In step 3 the user then designates the specific location in the 3D CAD model and the SAMD 200 is positioned at that location within the model, and the user also may enter the orientation of the plane within which the array of modules of the solar energy system will be installed, and the user may also enter the desired solar access intervals over which solar access is to be calculated. For example one solar access interval may be annual solar access, and the others may be monthly solar access in which there is a different solar access value for each month of the year. In step 4, the SAMD 200 then queries the 3D CAD model for the latitude, longitude, scaling factor, azimuth orientation, and gravitational orientation of the 3D CAD model. Alternatively the user enters the latitude, longitude, scaling factor, azimuth orientation, and gravitational orientation of the 3D CAD model. In step 5, the SAMD 200 establishes an initial location of the sun within the 3D CAD model. For example, the initial location may be the location of the sun on January 1 at 12:01 AM, based on the latitude of the location of the SAMD within the geo-referenced 3D CAD model. Initial values for the solar access over the desired solar access intervals are established to be zero. An iteration time interval is established based on the desired resolution of the solar access calculations. For example, an iteration time interval of 15 minutes may be established. The iteration time interval may be any arbitrary time interval depending on a tradeoff between desired resolution of the solar access calculations and the desired processing speed. In step 6, the SAMD 200 models a geometric ray that originates at the SAMD 200 and ends at the location of the sun in the 3D CAD model, or alternatively the ray originates at the location of the sun and ends at the location of the SAMD 200. In step 7, the ray is analyzed to determine if it intersects any of the obstructions within the 3D CAD model. In step 8, the SAMD 200 calculates the amount of energy available from the sun that will impinge on the location of the SAMD 200 within the iteration time interval when the sun is at that position in the sky relative to the orientation of the module array. If the ray intersects an object in the 3D CAD model, then the energy is zero, otherwise it is the full energy available within the time interval. Then in step 9, the sun is moved to another location in the 3D CAD model based on a new time that is the initial time plus the iteration time interval. Then steps 6-9 are repeated until the entire year has been analyzed. Then in step 10, the process ends.

In one example, the sun's energy is calculated by integrating the sun's power (for example in $kW/m^2$) over the iteration time interval to calculate the energy (for example in $kW-hr/m^2$). The sun's power may be calculated based on the latitude, the sun's position in the sky in the 3D CAD model, and the historical irradiance for the latitude and longitude. The energy in the iteration time interval may be this calculated energy if the ray does not intersect an obstruction or may be zero if it does. Alternatively, the power may be the power calculated within the integration if the ray does not intersect an obstruction and zero if it does.

When the SAMD is located in a 3D CAD model, it is convenient and fast to repeat measurements of solar access for many positions (typically a latitude, longitude, and elevation) of the SAMD in the 3D CAD model generating many open sky matrixes associated with the positions of the SAMD. The measurements may be repeated until all possible positions, or a subset of all possible positions, of the SAMD within the 3D CAD model have been analyzed. The SAMD may be moved, for example, along a 1 foot by 1 foot grid along all outer surfaces in the 3D CAD model. The resulting set of open sky matrixes may be processed by the processor 206 into solar access data that can then be stored and used for future querying of the solar access anywhere in the 3D model, or it may be processed to generate a heat map or color gradient as an overlay texture on every surface in the 3D CAD model. This may provide the operator of the SAMD with a view of the site so he can identify the "hottest" area or the best location on a roof, for example, for the modules of a new solar energy system. The software may also show where the shadows will mostly fall and may suggest, for example, the optimal configuration of the panels or solar modules of a solar energy system.

In yet another example of operation, the SAMD 200 may be used to position satellite antennas. When directing an antenna at a geosynchronous satellite, it is desirable to have the dish both point in the direction of the satellite and avoid obstructions between the dish and the satellite. In this example, the SAMD 200 may be positioned within a 3D CAD model and may include a skyline detector 202 with a virtual image sensor, virtual compass and virtual inclinometer, and a database of azimuth and elevation angles of all known satellites. The skyline detector may locate the skyline in the direction of the satellite and the SAMD 200 may determine the intersection of any obstacles with the line of site between the dish and the satellite. As a result, the SAMD 200 may provide a figure of merit to the user for a particular desired location of the dish and suggest a direction in which to move the dish. Alternatively, the optional output device 210 (such as image display) may show an image of the skyline and superimposed on the image the optional output device 210 may show the location of the satellite. The user may then see in the optional output device 210 where the satellite is being obstructed. Because many home owners prefer satellite dishes to be out of view, it is often necessary to balance between strong signal reception and aesthetics and the SAMD 200 may help optimize this tradeoff.

In yet another example of operation, the SAMD 200 may be used to position antennas on a roof to give line-of-site transmission to a regional transceiver station. This may be, for example, part of a wireless network service provided to a neighborhood or region in which there is one or more base-station transceivers providing wireless connections to one or more customers in the region. The wireless connection may be, for example, wireless internet service or WiFi service. When directing an antenna, located on for example on a customer's roof, at a regional base station transceiver, it is desirable to have the antenna both point in the direction of the satellite and avoid obstructions between the dish and the satellite. In this example, the SAMD 200 may be positioned within a 3D CAD model and may include a skyline detector 202 with a virtual image sensor, virtual compass and virtual inclinometer, and a database of azimuth and elevation angles of all known satellites. Alternatively, the SAMD 200 may use ray tracing. The skyline detector may locate the skyline in the direction of the base station and the SAMD 200 may determine the intersection of any obstacles with the line of site between the antenna and the base station. As a result, the SAMD 200 may provide a figure of merit to the user for a particular desired location of the antenna. It may further suggest a direction in which to move the antenna. Alternatively, the optional output device 210 (such as image display) may show an image of the skyline and superimposed on the image the optional output device 210 may show the location of the base station. The user may then see in the optional output device 210 where the base station is being obstructed. Because many home owners prefer antennas to be out of view, it is often necessary to balance between strong signal reception and aesthetics and the SAMD 200 may help optimize this tradeoff.

In another example of operation, the SAMD 200 may include software and/or a database of plants and their preferred light conditions. Different plants and trees grow best with different amounts of daily, monthly, or yearly sunlight. In this example, the SAMD 200 is positioned in a 3D CAD model that includes the desired location of plants or trees and the surrounding obstructions, and it may be utilized by landscapers and landscape architects to choose the plants and trees for a location in a garden or yard. The amount of sun that hits a particular location is dramatically affected by the shading characteristics of that location. The SAMD 200 may measure the amount of sun access at a location taking into account shading and suggest plants that would grow best.

In another example of operation, the 3D CAR model used by the SAMD 200 may be a CAD drawing for a new house or building. The user may then simulate how sunlight will interact with the new structure. For example if there is a large tree in front of the house, it may be determined if that tree will block morning sun in the winter. Then the house design may be modified if different lighting is desired. This is also useful for architects integrating passive solar design aspects into the house. In this design methodology, solar heating of floors, walls, etc is considered in the building design to optimize heating the house in the winter and cooling the house in the summer. Again the combined solar radiation data in the 3D CAD model may be used to modify the design to optimize different aspects of the structures interaction with the sun.

In another example of operation, the SAMD 200 may measure ambient light (as opposed to just direct sunlight). This is useful for planning new construction in which it is desirable to optimize natural lighting inside the building. The skyline is captured and the open sky is identified. The amount of ambient light is measured by integrating over the open sky region. In the planning of a new building in, for example, a crowded urban site, it may be desirable to know the ambient light exposure that would be received at different levels of a new building. The SAMD 200 may be positioned anywhere in 3 dimensions within the 3D CAD model to simulate the lighting at that point.

In another example of operation, the SAMD 200 may include a processor operable to identify windows in a captured image take from inside the 3D CAD model of a house and optionally the obstructions surrounding the house. The SAMD 200 may then calculate the amount of sun that enters through the window. This SAMD 200 may be used by realtors showing a 3D CAD model of a house to a potential buyer that is interested in how much sun enters the house and at what time of day and year.

Persons skilled in the art will understand and appreciate, that one or more processes, sub-processes, or process steps described may be performed by hardware and/or software. Additionally, the process described above may be implemented completely in software that would be executed within a microprocessor, general-purpose processor, combination of processors, digital signal processor ("DSP"), and/or application specific integrated circuit ("ASIC"). If the process is performed by software, the software may reside in software memory in the memory 208, processor 206, skyline detector 202 processor, an external processor (not shown) in signal communication with the optional communication bus 212, or combination. The software in software memory may include an ordered listing of executable instructions for implementing logical functions (i.e., "logic" that may be implemented either in digital form such as digital circuitry or source code or in analog form such as analog circuitry or an analog source such an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium", "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

In yet another example when the SAMD is positioned in a 3D CAD model, the shape of the obstructions are projected onto the surface of the sun paths or sky dome. The sun paths may be represented in the 3D CAD model as a 3D band through the sky modeling all the possible location so the sun throughout the year. The skyline formed by the obstructions is projected onto the surface of the sun paths. This can be visualized as a virtual light source at the position of the SAMD emitting light toward the skyline. The shadow cast by the skyline on the sun paths is the projection. This projection is then stored in the EXPOSURE matrix described below where the projection or shadow is represented as a 0 and areas where there is no projection or shadow represented as a 1. Alternatively the sun paths may be projected onto the sky dome and the skyline is also projected onto the sky dome. The EXPOSURE matrix is generated from the overlap of these two projections.

Figure 10:
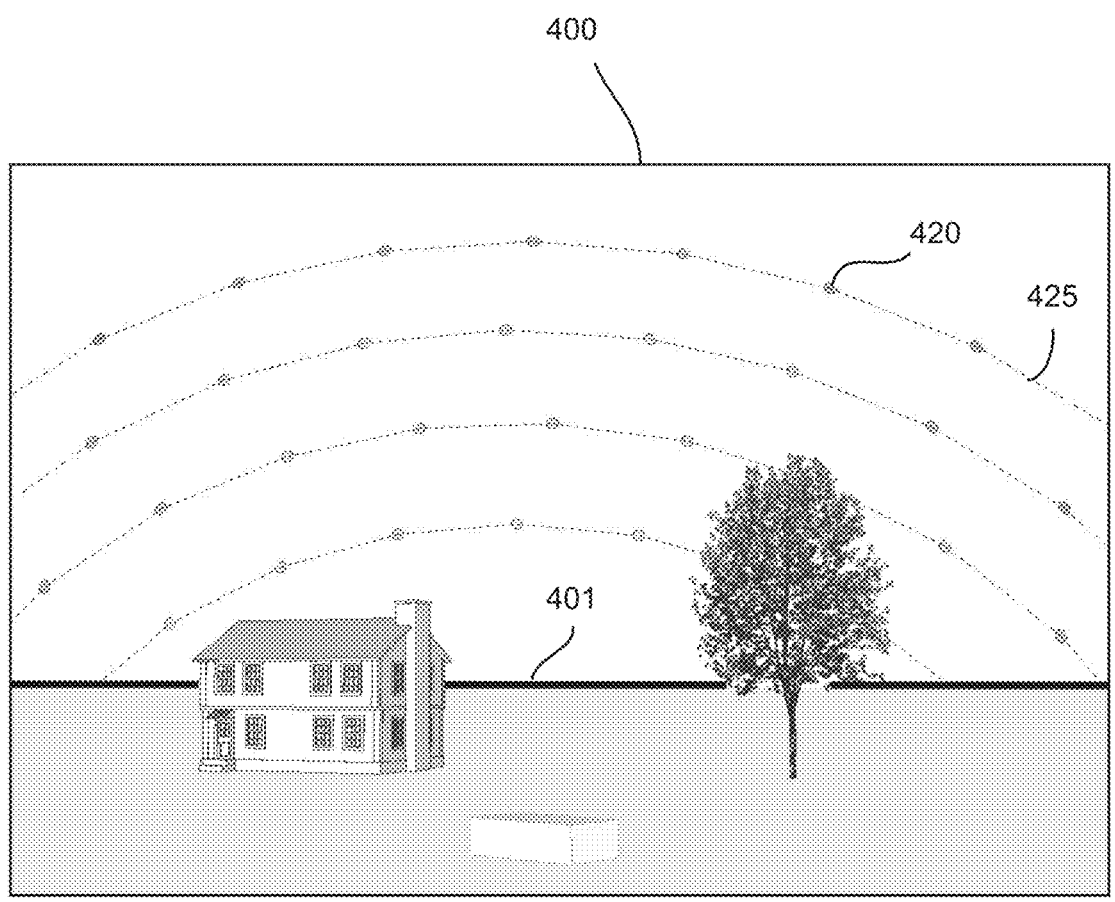
FIG. 10 shows an example of an image with predicted sun paths relative to the horizon.

FIG. 10 illustrates an image obtained from a 3D CAD model, the image 400 includes a horizon 401 and sun positions 420 along various sun paths 425 as predicted throughout the year at the position associated with the image.

Figure 11:
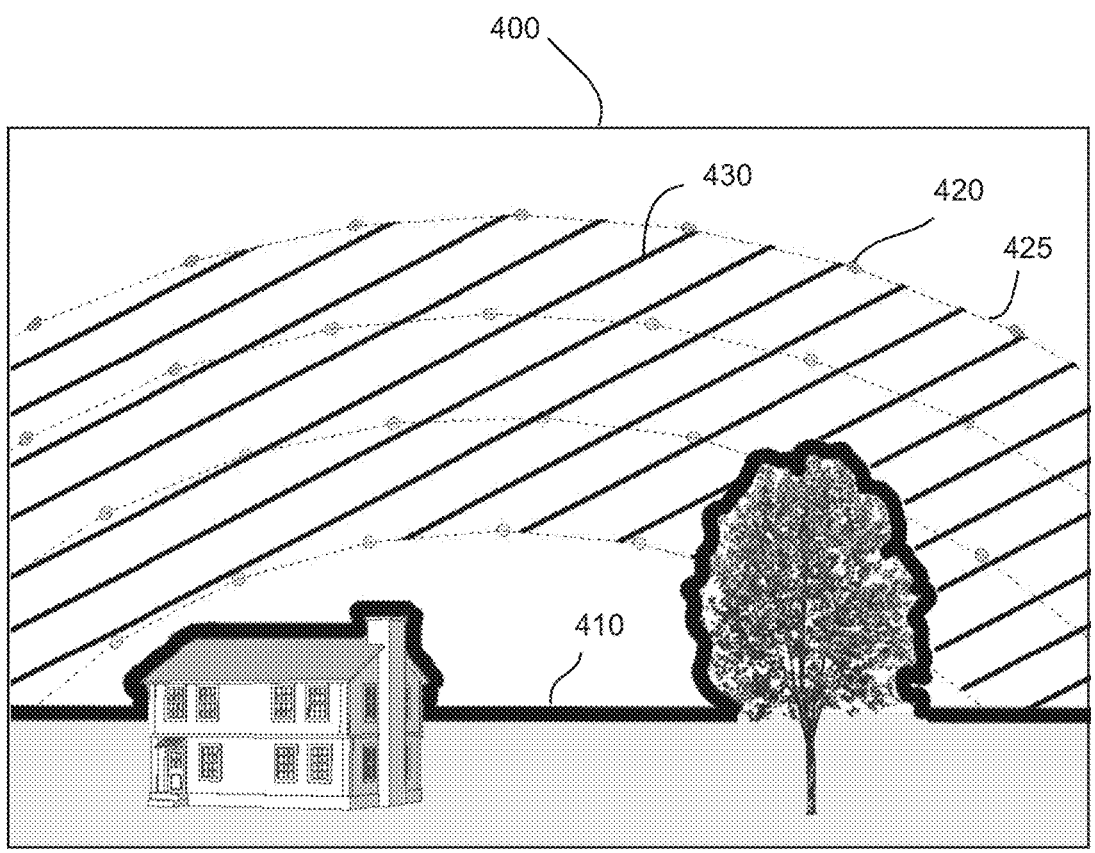
FIG. 11 shows an example of an image with predicted sun paths relative to the processed skyline for a predetermined position.

FIG. 11 further illustrates the image 400 of FIG. 10 further showing the skyline 410 and the EXPOSURE matrix 430.

In yet another example of the SAMD, the skyline detector and orientation determination unit are hardware devices that exist in the real-world. The skyline detector captures an image of an open space where the open space includes a 2D rendering of a 3D CAD model. The 2D rendering may be on a 2D display such as an LCD computer display or may be printed on paper or may be another form of 2D rendering of a 3D CAD model. The 2D rendering is oriented such that the azimuth orientation and inclination of the rendered scene is the same as the azimuth orientation and inclination of the real-world that it represents. The scale of the 2D rendering is such that the image captured by the skyline detector is the same scale as if the SAMD were capturing the image of the skyline of the real-world that the 3D CAD model represents. Alternatively a known scaling factor or set of scaling factors are entered into the user interface of the SAMD and used by the processor to appropriately scale the image. These scaling factors may, for example, be applied to the image calibration matrix.

FIG. 12 illustrates a method for solar access measurement in accordance with the embodiments herein and comprises: within a computerized system comprising a 3D CAD model configured to obtain an image of a virtual horizon that includes a virtual skyline at a predetermined virtual position, wherein said virtual horizon corresponds to a real world horizon, said virtual skyline corresponds to a real world skyline, and said virtual position corresponds to a real world position: obtaining an image of the virtual horizon; determining the azimuth orientation and inclination of the obtained image; and determining solar access based on the virtual skyline within the obtained image, the measured the azimuth orientation and inclination of the obtained image, and the position associated with the image.

In another embodiment, a non-transitory computer-readable medium with an executable computer program comprises an ordered listing of executable instructions stored thereon, wherein the computer program, when executed, instructs a processor to perform a method, the method includes: obtaining an image of a horizon that includes a skyline; determining the azimuth orientation and the inclination of the obtained image; and determining solar access based on the skyline within the obtained image, the measured azimuth orientation and inclination of the obtained image, and a position associated with the image of the horizon.

In certain embodiments the image is obtained by a virtual image sensor of a 3D CAD model digitally representing a real-world open area. As described above, the virtual image sensor may be embodied in a software algorithm.

In certain other embodiments the image obtained from the 3D CAD model includes a virtual horizon and a virtual skyline. The virtual horizon may include a representation of a real-world horizon at the position of the obtained image.

In certain other embodiments the image can be obtained from at least a portion of one or more images stored on a computerized database.

In certain other embodiments the image can be obtained by a skyline detector configured to capture an image of an open space, wherein the open space includes a 2D rendering of a 3D CAD model. The skyline detector may be embodied in a computerized algorithm.

In another embodiment, a method for determining solar access, includes: within a computerized system comprising a 3D CAD model configured to obtain an image of a virtual horizon that includes a virtual skyline at a predetermined virtual position, wherein the virtual horizon corresponds to a real world horizon, the virtual skyline corresponds to a real world skyline, and the virtual position corresponds to a real world position: obtaining an image of the virtual horizon and the virtual skyline associated therewith; determining the azimuth orientation and the inclination of the obtained image; and processing the obtained image to locate the skyline in the obtained image; and determining solar access based on the virtual skyline within the obtained image, the measured azimuth orientation and inclination of the obtained image, and the position associated with the image. The method may further include: determining paths of the sun throughout a range of times of day and days of year for a particular latitude of the predetermined location; and determining the amount of solar radiation that will impinge the predetermined location throughout the range.

In yet another embodiment, as illustrated in FIG. 13, a method for determining solar radiation exposure at a predetermined position within a 3D CAD model utilizing a Solar Access Measurement Device ("SAMD") associated with the position includes: tracing rays from the position of the SAMD to the sun; determining whether the ray intersects an obstruction; and repeating for different locations of the sun and calculating the solar access.

It will be understood that the foregoing description of numerous implementations has been presented for purposes of illustration and description. It is not exhaustive and does not limit the claimed inventions to the precise forms disclosed. Modifications and variations are possible in light of the above description or may be acquired from practicing the invention. The claims and their equivalents define the scope of the invention.

What is claimed:

1. A non-transitory computer-readable medium with an executable computer program comprising an ordered listing of executable instructions stored thereon, wherein the computer program, when executed, instructs a processor to perform a method, the method comprising:

obtaining an image of a horizon that includes a skyline, wherein said image is obtained by a virtual image sensor of a 3D CAD model digitally representing a real-world open area;

determining the azimuth orientation and the inclination of the obtained image; and determining solar access based on the skyline within the obtained image, the measured azimuth orientation and inclination of the obtained image, and a position associated with the image of the horizon.

2. The non-transitory computer-readable medium of claim 1 wherein the image from the 3D CAD model includes a virtual horizon and a virtual skyline.

3. The non-transitory computer-readable medium of claim 2 wherein the virtual horizon is a representation of a real-world horizon at the position of the obtained image.

4. The non-transitory computer-readable medium of claim 1 wherein the virtual image sensor is embodied in a software algorithm.

5. The non-transitory computer-readable medium of claim 1 wherein said image is obtained from at least a portion of one or more images stored on a computerized database.

6. The non-transitory computer-readable medium of claim 1 wherein said image is obtained by a skyline detector configured to capture an image of an open space, wherein the open space includes a 2D rendering of a 3D CAD model.

7. The non-transitory computer-readable medium of claim 6 wherein the skyline detector is embodied in a computerized algorithm.

8. A method for determining solar access, comprising:

within a computerized system comprising a 3D CAD model configured to obtain an image of a virtual horizon that includes a virtual skyline at a predetermined virtual position, wherein said virtual horizon corresponds to a real world horizon, said virtual skyline corresponds to a real world skyline, and said virtual position corresponds to a real world position:

obtaining an image of the virtual horizon and the virtual skyline associated therewith;

determining the azimuth orientation and inclination of the obtained image; and processing the obtained image to locate the skyline in the obtained image; and determining solar access based on the virtual skyline within the obtained image, the measured azimuth orientation and inclination of the obtained image, and the position associated with the image.

9. The method of claim 8, further comprising:

determining paths of the sun throughout a range of times of day and days of year for a particular latitude of the predetermined location; and determining the amount of solar radiation that will impinge the predetermined location throughout the range.

* * * * *